United States Patent [19]
Debbaut et al.

[11] Patent Number: 5,863,215
[45] Date of Patent: Jan. 26, 1999

[54] TELECOMMUNICATIONS TERMINAL BLOCK

[75] Inventors: Christian Arthur Marie-Louise Debbaut, Cary; William Joseph Curry, Apex; Kimberley Ann Jessup, Raleigh; Julian Sean Mullaney, Raleigh; Michael Eugene Grice, Cary, all of N.C.

[73] Assignee: Raychem Corporation, Menlo Park, Calif.

[21] Appl. No.: 606,263

[22] Filed: Feb. 23, 1996

Related U.S. Application Data

[60] Division of Ser. No. 46,059, Apr. 12, 1993, Pat. No. 5,557, 250, which is a continuation-in-part of Ser. No. 906,803, Jun. 30, 1992, abandoned, Ser. No. 906,952, Jun. 30, 1992, abandoned, and Ser. No. 954,612, Sep. 30, 1992, abandoned, which is a continuation-in-part of Ser. No. 776,501, Oct. 11, 1991, abandoned.

[51] Int. Cl.⁶ .................................................. H01R 4/24
[52] U.S. Cl. ............................................ 439/412; 439/204
[58] Field of Search .................................. 439/411, 412, 439/413, 417, 521, 201, 204, 395, 396

[56] References Cited

U.S. PATENT DOCUMENTS

| | | | |
|---|---|---|---|
| 2,583,530 | 1/1952 | Hasselbohm | 439/395 |
| 4,018,499 | 4/1977 | Rickards | 439/396 |
| 4,258,973 | 3/1981 | Reynolds et al. | 439/395 |

*Primary Examiner*—Khiem Nguyen
*Assistant Examiner*—Yong Kim
*Attorney, Agent, or Firm*—Herbert G. Burkard

[57] ABSTRACT

Insulation displacing connectors of an "inverted" type extend upwardly from a base of the terminal block into connector chambers of driver modules movable relative to the base between upper and lower positions. Passageways within the modules direct service wires moved through the passageways into the connector chambers and into entrance openings underlying upper edge portions of the insulation displacing connectors within the chambers. Movement of the module from its upper position to its lower position drives the service wires downwardly from the entrance openings of the connectors into and through slots underlying the entrance openings, to establish electrical contact with the service.

3 Claims, 21 Drawing Sheets

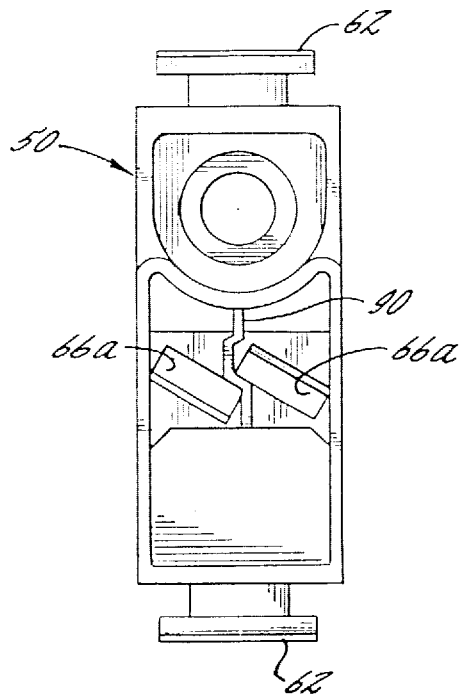
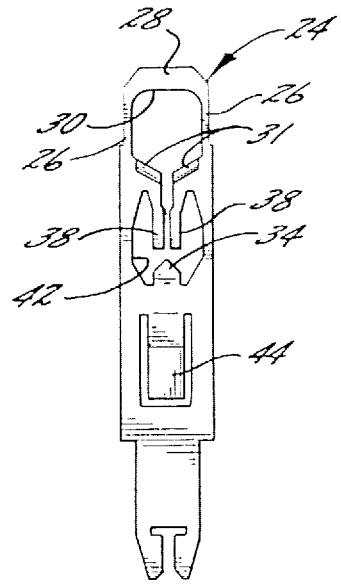
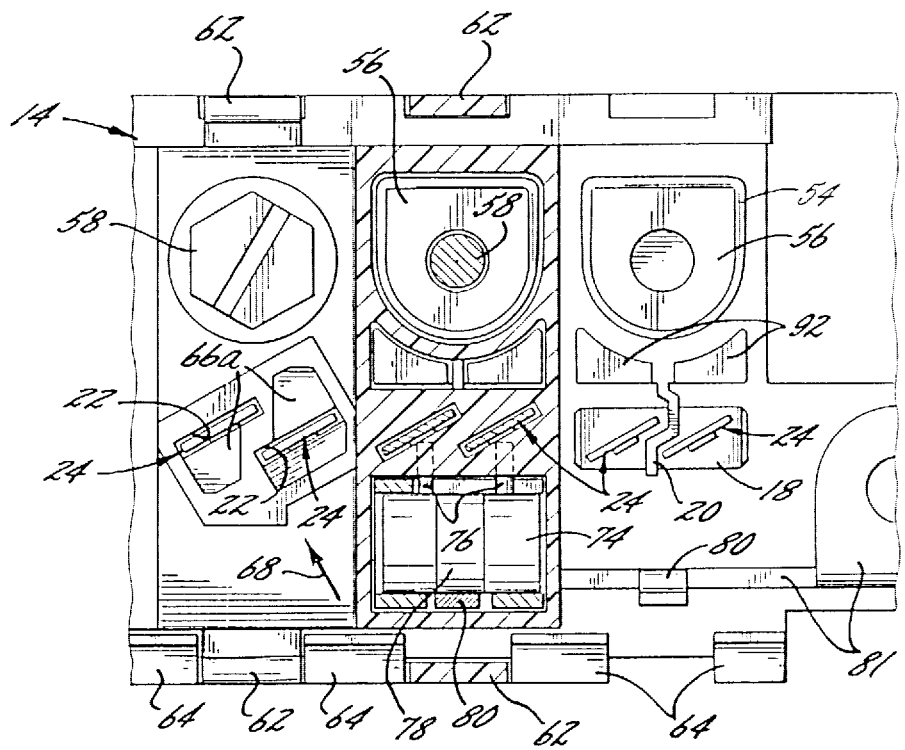
FIG. 6
FIG. 8
FIG. 7

FIG.11a
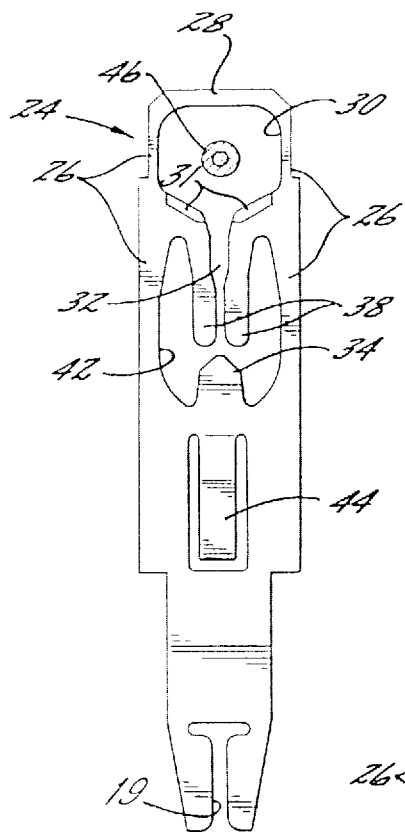
FIG.11b
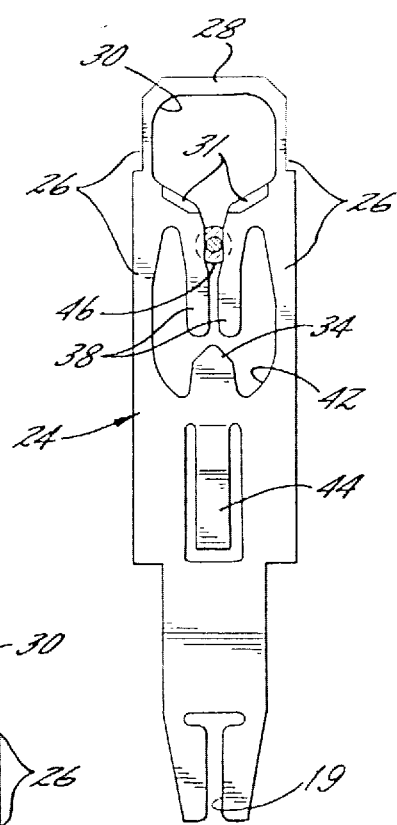
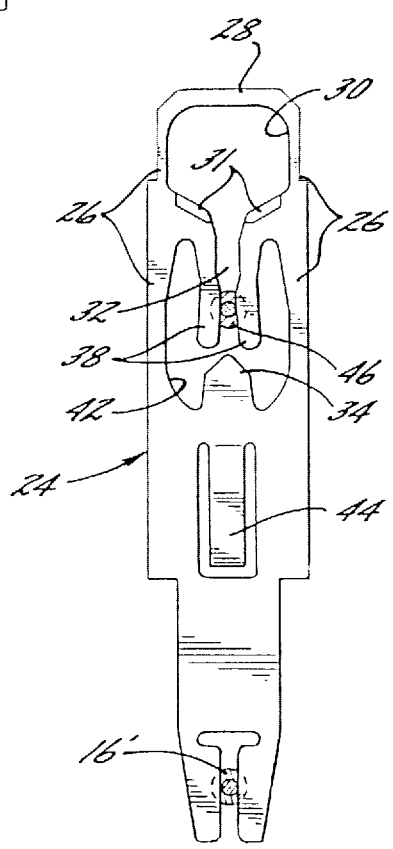
FIG.11c

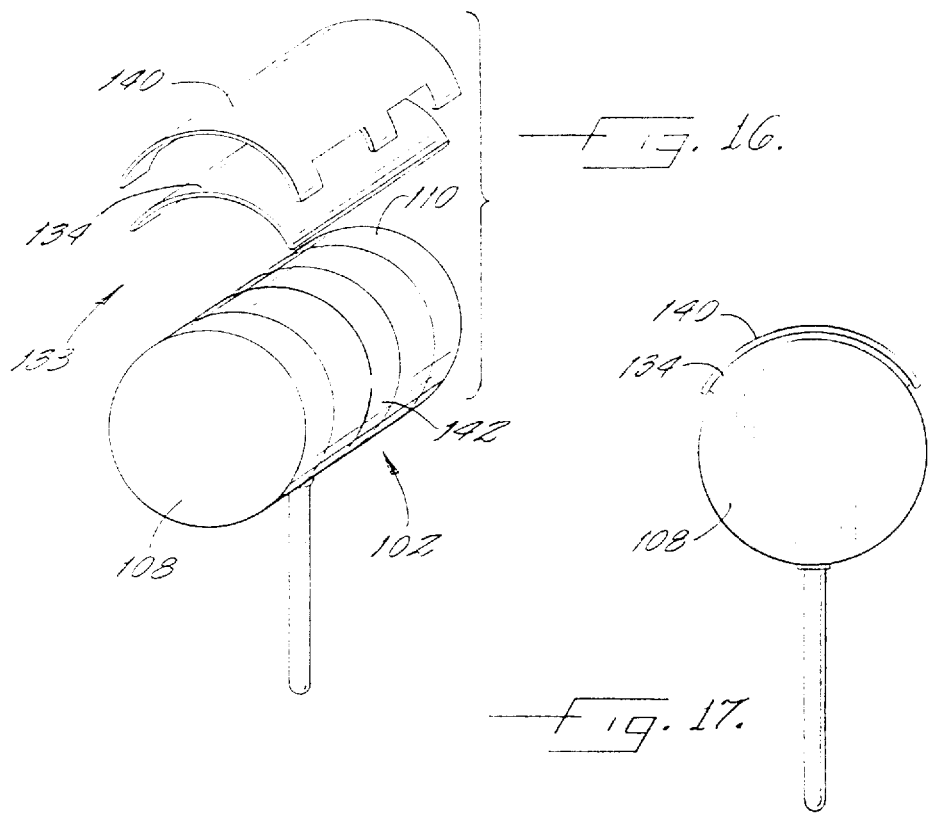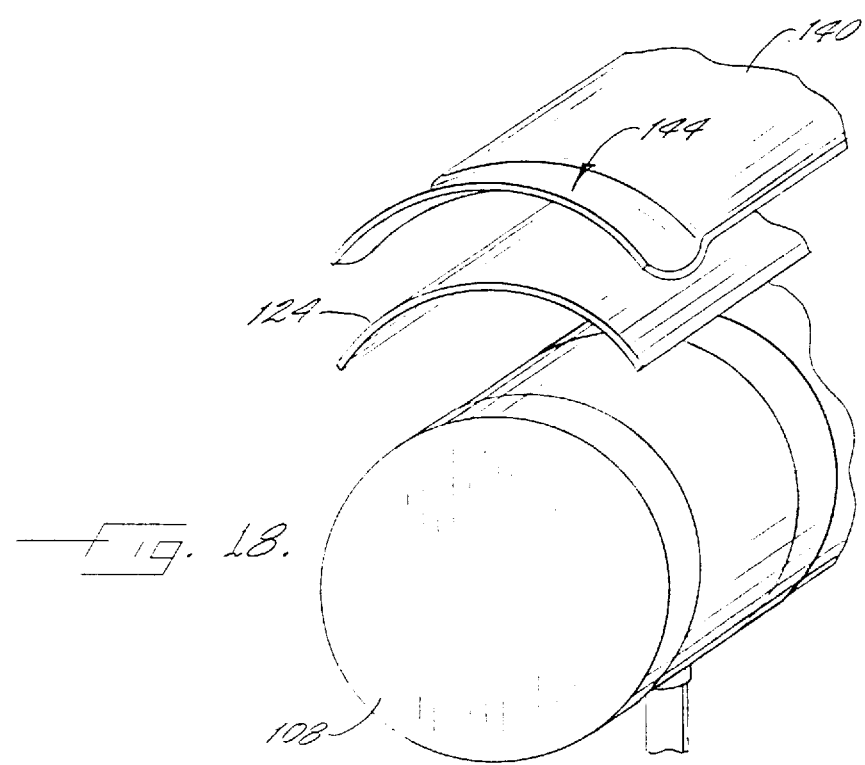

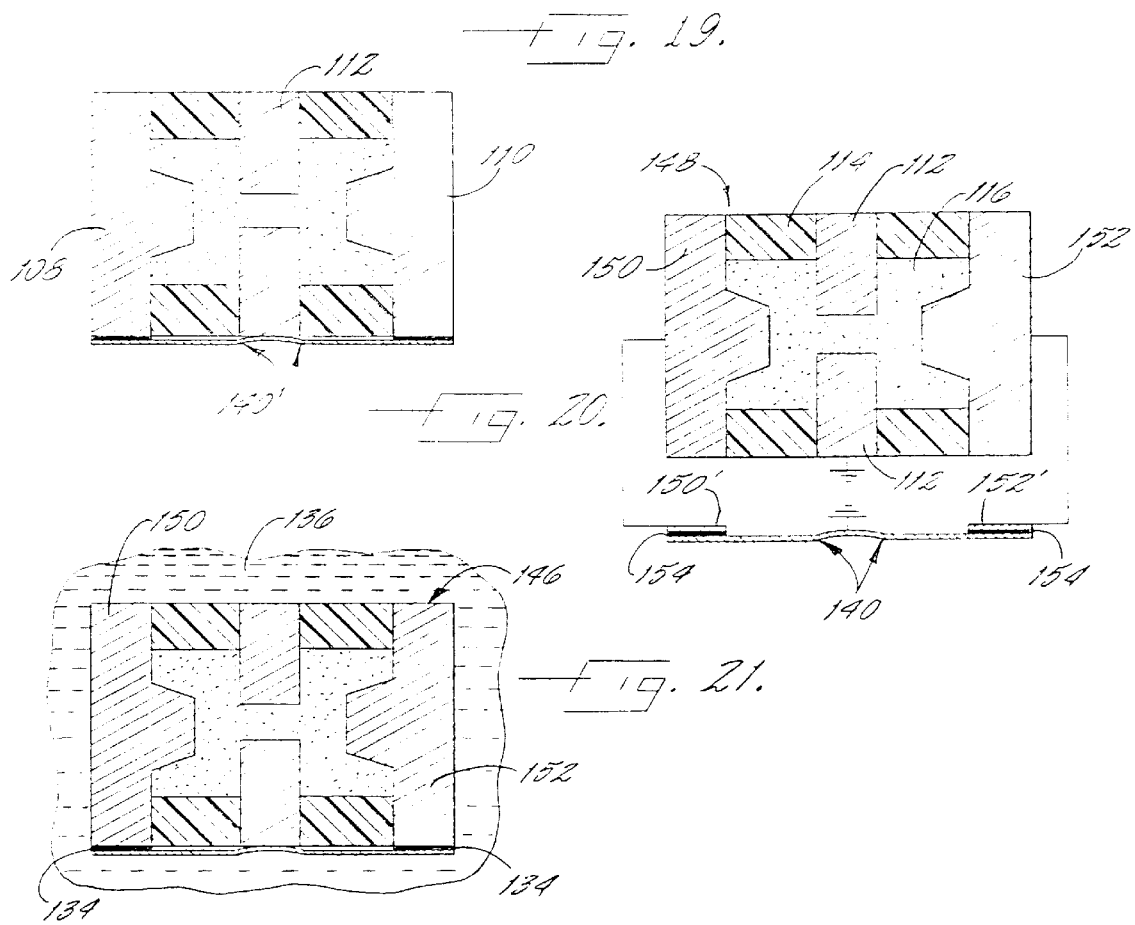
Fig. 19. Fig. 20.
Fig. 21.
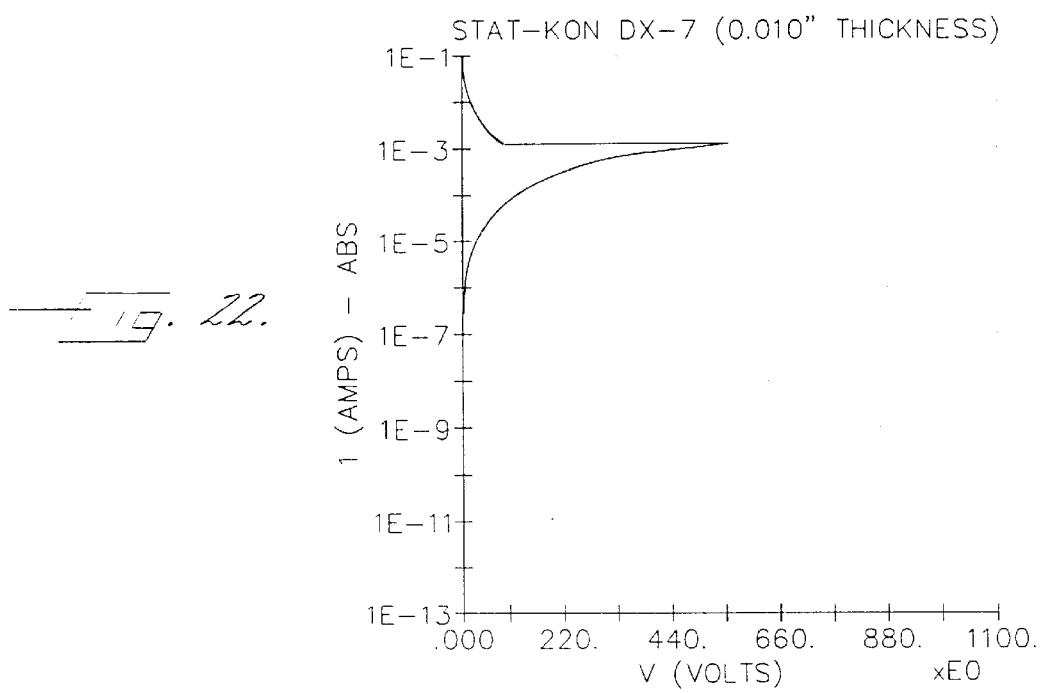
Fig. 22.

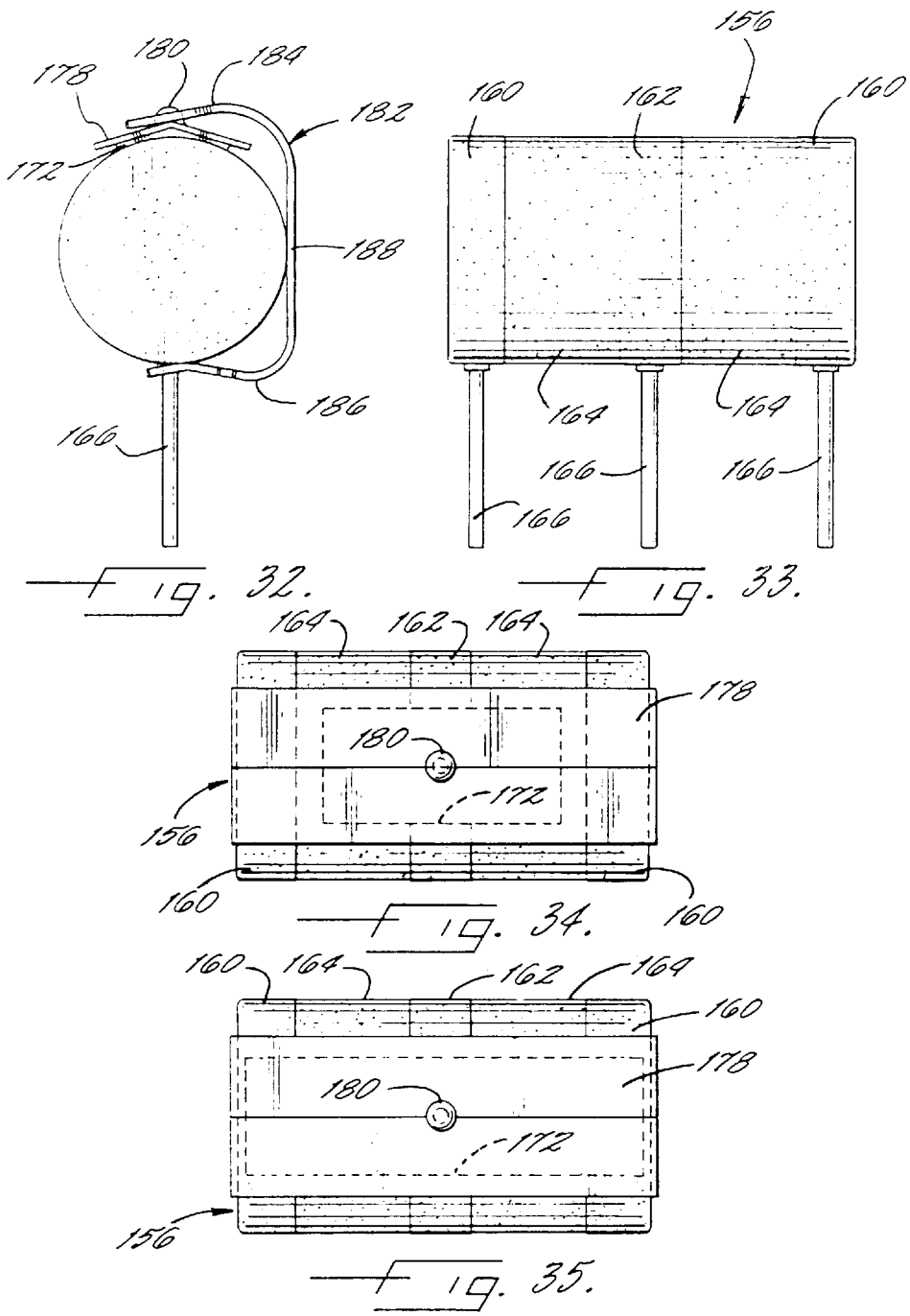

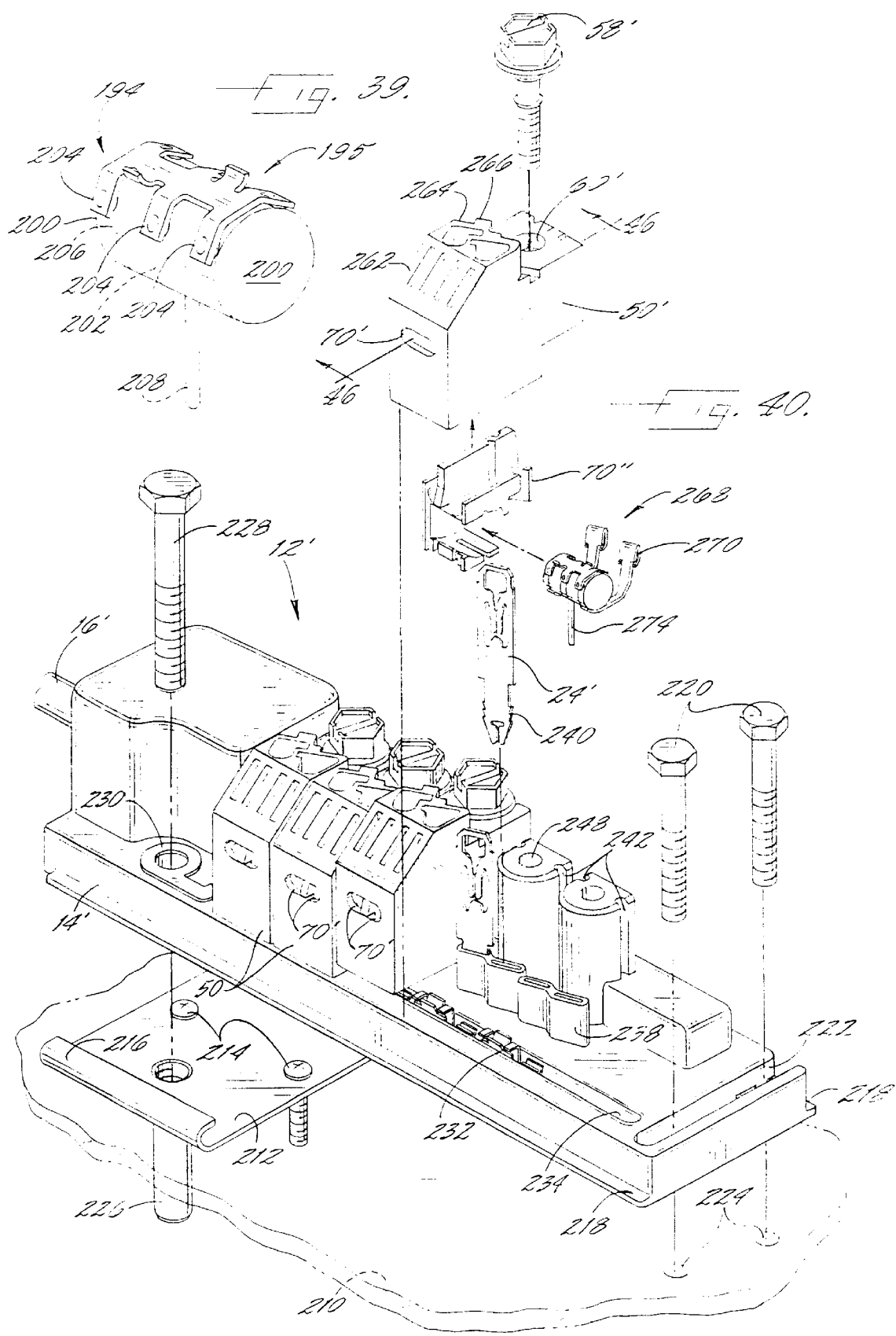

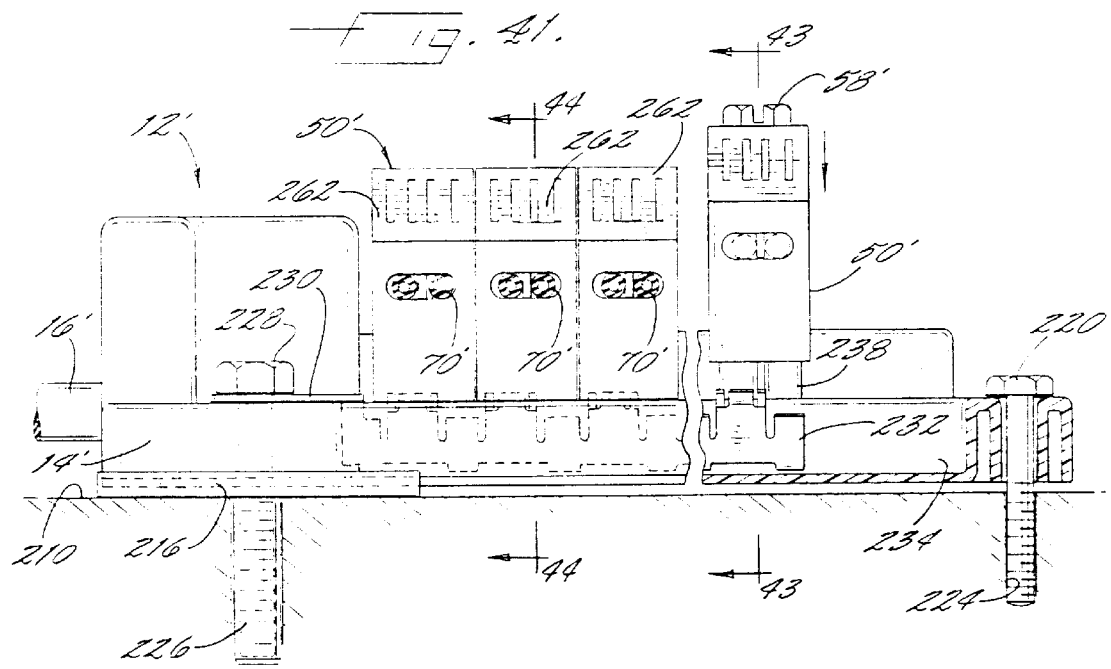
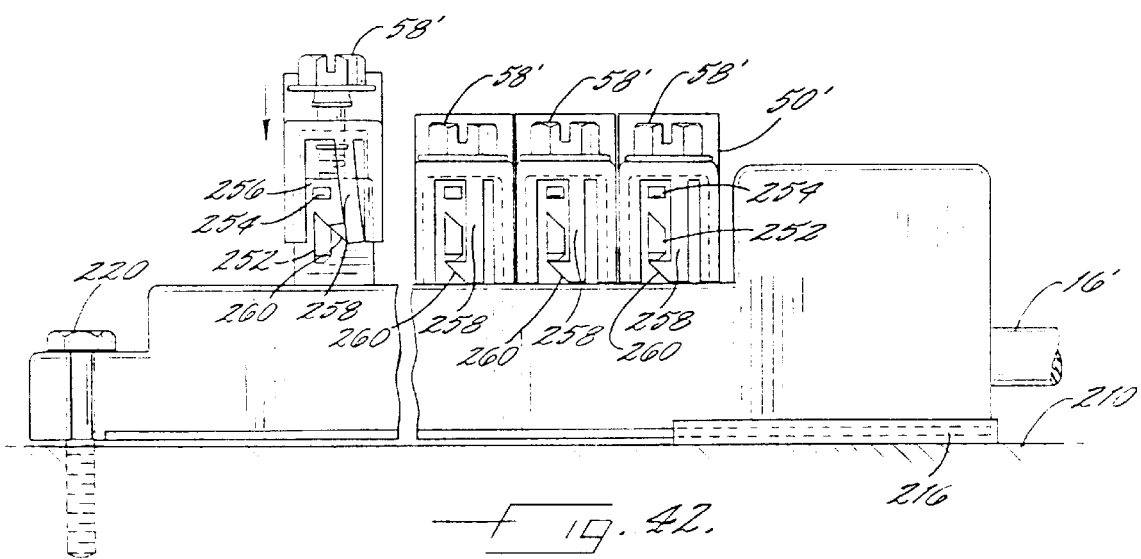

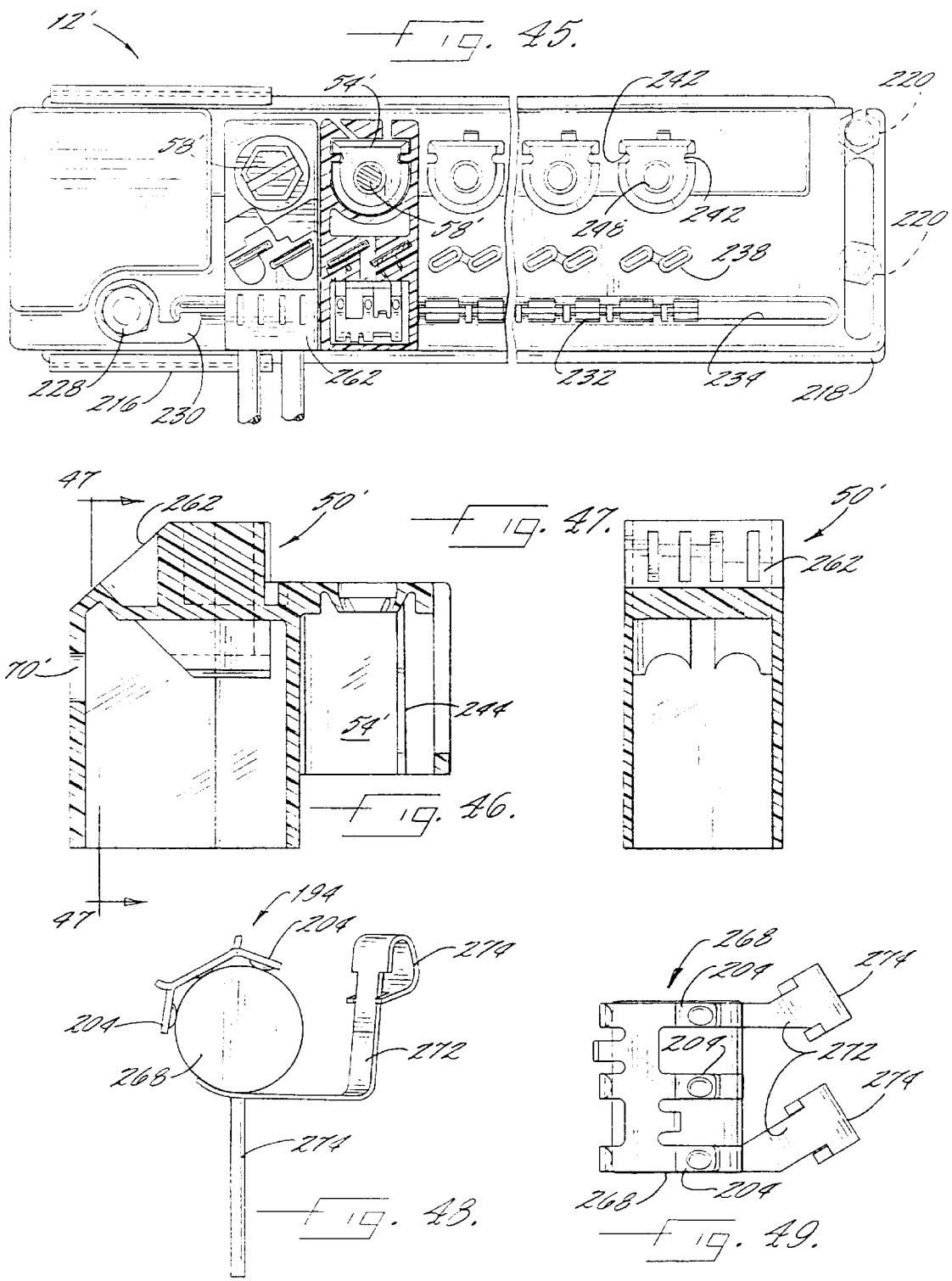

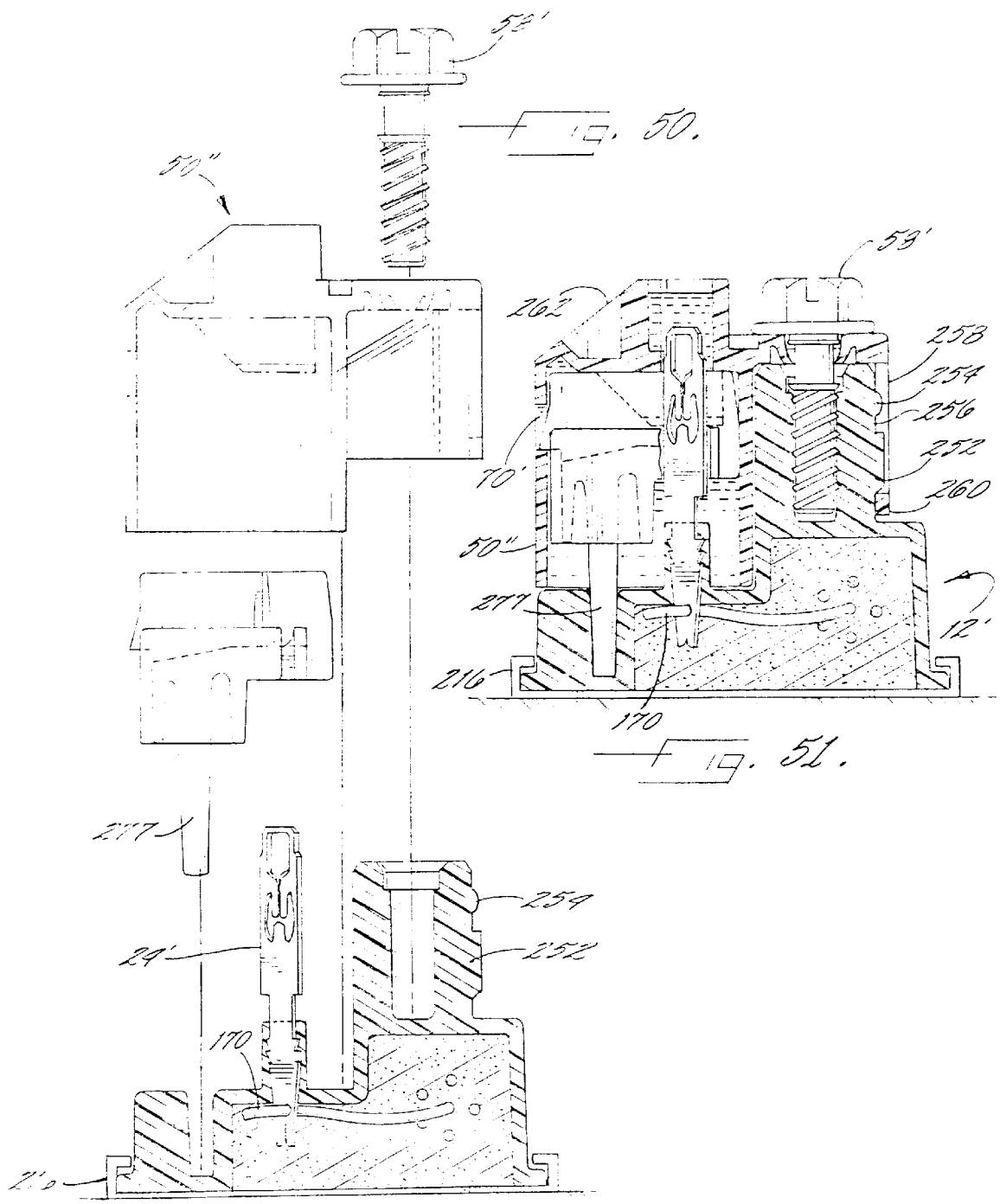

TELECOMMUNICATIONS TERMINAL BLOCK

CROSS-REFERENCE TO RELATED APPLICATIONS

This application is a division of application Ser. No. 08/046,059, filed 12 Apr. 1993, U.S. Pat. No. 5,557,250, which is a continuation-in-part of application Ser. No. 07/906,803, filed 30 Jun. 1992 abandoned; and of application Ser. No. 07/906,952, filed 30 Jun. 1992 abandoned; and of application Ser. No. 07/954,612, filed 30 Sep. 1992, abandoned, which is a continuation of application Ser. No. 07/776,501, filed 11 Oct. 1991, abandoned.

FIELD OF THE INVENTION

This invention relates to terminal blocks used by telecommunication companies to connect conductor wires of a multicore cable to service wires that extend to customer residences or places of business. The invention more specifically relates to an improved terminal block of the type that contains viscous sealant material.

BACKGROUND OF THE INVENTION

A terminal block of the aforesaid type is usually mounted outdoors. Even when surrounded by a protective housing, it is exposed to rain, snow, sleet, ice, temperature fluctuations, dirt, insect infestation and similar conditions that may adversely affect the electrical connections between the service wires and electrical connectors, which may be and usually are of the insulation displacing type, within the blocks. To minimize incursion of foreign matter, viscous sealing material has heretofore been provided within interior areas of prior art terminal blocks. The protection afforded by the sealant material usually is adequate for as long as the original connections between the service wires and the associated insulation displacing connectors remain undisturbed, but has heretofore rapidly decreased in proportion to the number of times that the connections are re-entered (i.e, broken and reestablished) by a telecommunications craftsperson. The decreasing protection is due to the fact that each re-entry displaces some of the sealant and causes the formation therein of voids that permit ingress of air, dirt, moisture, insects and the like. The use of sealant of the gel type minimizes the size of such voids but does not entirely eliminate their formation. Reliable protection of the terminal block against surge (i.e., overvoltage and/or overcurrent) conditions is also highly desirable since in the absence of such protection lightning strikes, engagement of the telephone wires by power lines, or similar conditions can severely damage the terminal block and components or structures adjacent thereto and/or connected therewith.

SUMMARY OF THE INVENTION

The present invention provides an improved telecommunications terminal block, of the type containing protective viscous sealant material, that is of compact, durable and economical construction; can be re-entered a number of times without significant decrease in the efficacy of the protection afforded by the sealant material; provides surge protection when that is desired; and that can be readily installed and used by a craftsperson upon a telephone pole or in other exposed locations to connect service wires having a wide range of gauges.

In its preferred embodiment the terminal block includes an elongate base that is adapted to be secured to a telephone pole or other supportive structure, and further includes at least one and usually a plurality of driver modules that are cantilever mounted upon the base in laterally adjacent relationship to each other for individual movement relative to the base between first (illustratively upper) and second (illustratively lower) positions respectively distal from and adjacent to the base. Movement of each module between its first and second positions preferably is effected by a threaded fastener that extends through an opening in a mounting chamber of the module and into a base within an underlying mounting post of the base. A plurality of pairs of insulation displacing connectors, which may be and preferably are of an "inverted" type, project upwardly from the base at spaced intervals along its length. Lower portions of the connectors are pre-joined to appropriate ones of the wires of a multi-core cable that extends into an interior part of the base filled with conventional potting material. The sections of the paired first and second connectors projecting from the base extend into respective first and second connector chambers of an overlying one of the driver modules upon the base. First and second pump chambers within the driver module communicate with respective ones of the connector chambers. First and second passageways extending from an outer surface of the module into the connector chambers direct the ends of first and second insulated service wires, that are inserted into and advanced longitudinally of such passageways by a craftsperson while the module occupies its upper position, into respective first and second ones of the chambers and into entrance openings of respective first and second ones of the insulating displacing connectors within the chambers. Movement of the driver module from its upper position to its lower position displaces the two insulated service wires downwardly into slots of the connectors and establishes electrical contact with respective ones of the connectors. In the case of heavily insulated service wires, the downward module movement also impales the insulation of the service wires upon retainer elements that underlie the slots and resist axial pull-out of the wires. The connector chambers, pump chambers and service wire passageways of each module contain protective sealant material, which preferably is of the gel type. Each module may include an electrical surge protector device which is both fail safe and vent safe, and which preferably is located in a space that also contains protective sealant material.

Each entry of the module disturbs the sealant to some extent, and may create undesirable voids therein. Sealant pump means are provided to compensate for the sealant disturbance, and to eliminate or at least reduce the size of voids created thereby in the sealant. In one embodiment the pump means includes first and second sealant pump chambers that are located in each driver module, communicate with respective first and second ones of the connector chambers and the service wire passageways of the module, and that contain reserve sealant.

The sealant pump means further includes pump piston elements that extend upwardly from the base of the terminal block into aligned ones of the pump chambers of an overlying driver module upon movement of the module from its upper position to its lower position. The aforesaid pump means drives enough reserve sealant material from the pump chambers into the connector chambers and service wire passageways as to eliminate or at least reduce the size of any voids present therein by reason of prior re-entries. The downward module movement also causes tip and ring contacts upon the surge protector device to engage contacts upon the insulation displacing connectors, and also grounds a third contact of the surge protector. In another embodiment tip and ring contacts upon the surge protector continuously engage respective ones of the insulation displacing connectors, and a third contact of the surge protector continuously engages ground, except when grounding of the protector is not desired, irrespective of the vertical position of the module. When surge protection is not included, a non conductive stud extends downwardly from the member that normally carries the surge protector and is received within an underlying slot in the base component of the terminal block, which usually houses the grounding bus. Interference between the grounding bus and the stud prevents misapplication. An upstanding flexible collarlike member upon the post containing the bore that receives the threaded fastener that imparts vertical movement to the driver module engages the undersurface of such screw and resiliently supports the same such as to permit the initial threads to be formed in the bore with only minimal downward force applied to the screw. This reduces the possibility of undesirable "stripping" of the internal screw threads of the bore.

At least part of each driver module preferably is formed of transparent material permitting exterior viewing of interior components, such as the aforesaid overvoltage limiting device, and monitoring of the correct insertion of the insulated service wires within the connector chambers and connector members of such driver module.

In one embodiment engageable and disengageable latch means, which includes cooperating latch elements upon each module and upon the base of the terminal block, prevent inadvertent complete removal of a module from the base and provide tactile feedback of the module's arrival at its upper position. In a second embodiment a detent element provides tactile and/or audible indication of the position of the module, and prevent inadvertent removal.

The fastener that drives each module is sequestered from the sealant material within the module so as to not shear or otherwise disturb the sealant.

Each of the insulation displacing connectors preferably is of an "inverted" type having an upper edge portion that extends between and interconnects upper ends of opposite side edge portions of the connector. A service wire entrance opening in adjacent underlying relationship to the aforesaid upper edge portion of the connector is adapted to initially receive, preferably at an angle of about 60°, the insulated service wire associated with the connector. Each service wire is displaced downwardly from the aforesaid entrance opening into and through a slot extending downwardly from the opening and having longitudinal sections of successively narrower width. A tooth-shaped retainer element underlying the slot impales the insulation upon, and thus resists axial pull-out of, a heavily insulated service wire. Each connector may also have a contact that is engaged by a contact of the surge protector device when the module occupies its lower position. Alternatively each connector may be engaged continuously by contacts of a surge protector.

In one embodiment an upper edge portion of at least one of the two connector chambers of each driver module preferably has a section that slopes so as to cause a thereto connected test clip to extend angularly away from the chamber and from a test clip upon the adjacent chamber. This prevents shorting of the clips against each other. In another embodiment the upper test port portion of one of the chambers containing the insulation displacing connectors is bordered by a wall that slopes or is otherwise so shaped as to prevent attachment of a test clip to it. This decreases the possibility of inadvertent placement of test clips so as to make electrical contact with the conductive blade. A similar result is achieved in still another embodiment by providing a shoulder intermediate the length of a test clip receiving wall bordering adjacent test ports.

DESCRIPTION OF THE DRAWINGS

FIG. 6 is a bottom plan view of a driver module;

FIG. 7 is a view showing at its left side a top plan view of a driver module, at its right side a top plan view of the part of the base underlying a driver module, and showing in its central portion and primarily in horizontal section components of the driver module and some associated components carried by the base of the terminal block;

FIG. 8 is a front elevational view of one of the insulation displacing connectors of the terminal block;

FIGS. 11a, b, and c are front elevational views of the connector of FIG. 8, showing sequential positions occupied by a lightly insulated service wire during movement thereof from an upper part to a lower part of the connector, and also showing a conductor of the multi-wire bundle within the base of the terminal block;

FIG. 16 is an exploded, somewhat schematic perspective view of a vent safe device of the present invention in association with a gas tube protector;

FIG. 17 is a partially exploded elevational view of components of the vent safe assembly of FIG. 16; FIG. 18 is an enlarged fragmentary top perspective of the gas tube and ground electrode/retainer shown in FIGS. 16 and 17;

FIG. 19 is a sectional view similar to FIG. 13 showing the vent safe device of FIGS. 16–18 upon the gas tube;

FIG. 20 is a partially schematic sectional view of an embodiment in which the vent-safe device is spaced from but electrically connected to the gas tube;

FIG. 21 is a sectional view of the gas tube and vent safe device of FIG. 19 encapsulated in a gel;

FIGS. 22–24 are IV-curves for different thicknesses of nonlinear resistive films usable in the vent safe device;

FIG. 32 is an end view of the arrestor and components of the overload mechanism in an assembled condition;

FIG. 33 is a side elevational view of the surge arrestor;

FIG. 34 is a top plan view of the assembly of FIG. 31, showing in phantom lines a solder billet whose opposite ends are spaced from line electrodes at opposite ends of the arrestor housing;

FIG. 35 is a view similar to FIG. 31 showing in phantom lines a solder billet whose ends extend to electrodes at opposite ends of the body of the arrestor;

FIG. 39 is a perspective view of another embodiment of a fail-safe mechanism for a surge protector;

FIG. 40 is a partially exploded front top perspective view of another embodiment of a terminal block, and of a support member underlying the terminal block;

FIG. 41 is a view primarily in front elevation, but partially in vertical section, showing the terminal block of FIG. 40 in an assembled condition;

FIG. 42 is a rear elevational view of the FIG. 41 terminal block;

FIG. 45 is a view primarily in top plan, but with some components shown in section, of the terminal block of FIGS. 40–42;

FIG. 46 is an enlarged sectional view of the main body of one of the driver modules of the terminal block of FIGS. 40–42;

FIG. 47 is a sectional view taken approximately along the line 47 through the driver module body of FIG. 46;

FIG. 48 is an end elevational view of another embodiment of a fail-safe device associated with a surge protector and an insulation displacing connector;

FIG. 49 is a top plan view of the components of FIG. 48;

FIG. 50 is an exploded view, partially in vertical section and partially in side elevation, of an ungrounded embodiment of the terminal block; and FIG. 51 is a view primarily in vertical section showing the components of FIG. 50 in assembled condition and with the driver module in a lower position.

DESCRIPTION OF THE PREFERRED EMBODIMENTS

Figure 1:
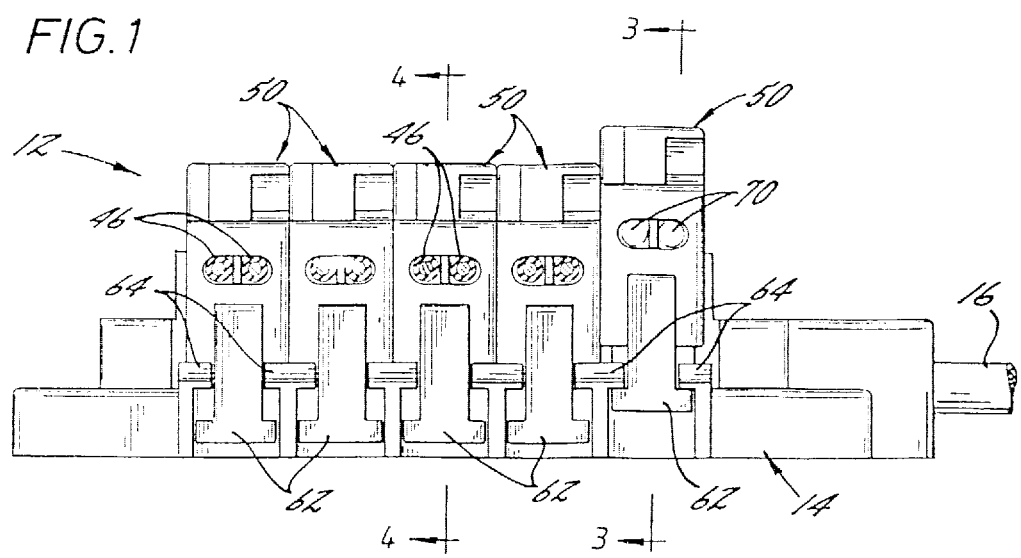
FIG. 1 is a front elevational view of a terminal block in accordance with the invention and of service wires extending into driver modules thereof, the rightmost driver module being shown in its upper position and the remaining driver modules being shown in their lower positions.
Figure 2:
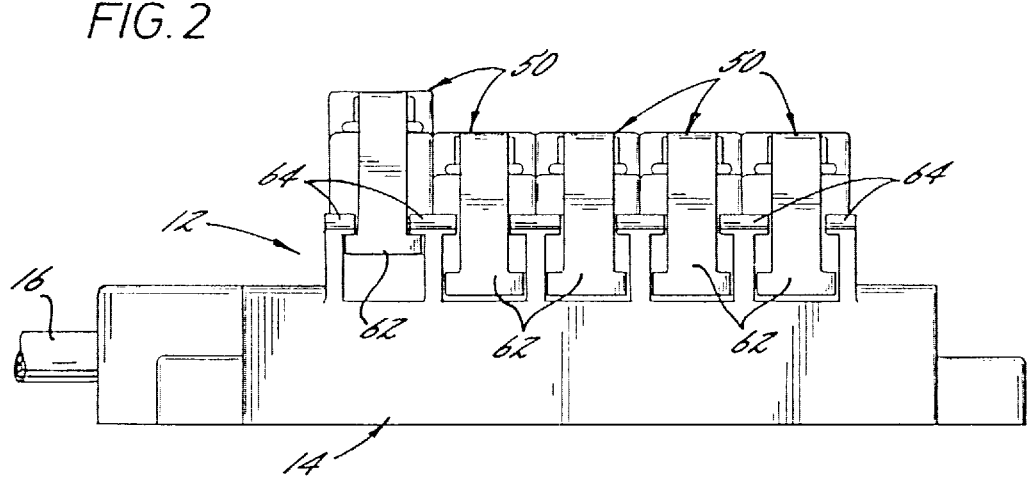
FIG. 2 is a rear elevational view of the terminal block.

The terminal block identified in its entirety in FIGS. 1 and 2 by the numeral 12 includes an elongate base 14 that may be of any desired length. Base 14 illustratively extends horizontally and is of generally rectangular shape. A multi-core cable 16 extends into a rearward section of base 14 from one end of the base. A plurality of bosses 18 project upwardly from base 14 at laterally spaced locations along its length. Each boss 18 has a low barrier wall 20 that extends transversely across a central part of the boss and rearwarcey from it. First and second slots 22 upon opposite sides of the wall 20 of each boss 18 extend vertically through such boss and the upper wall of base 14. The first and second slots 22 within each boss 18 respectively lie in generally vertical first and second planes that extend in substantially parallel transversely spaced relationship to each other, and in nonparallel relationship to a vertical plane containing the longitudinal axis of base 14.

First and second insulation displacing connectors 24 extend vertically through respective ones of the first and second slots 22 in each boss 18. Each connector 24 preferably is formed of beryllium copper alloy No. C17200 that has an extra hard temper and a minimum yield of 165 Ksi. The lower section of each connector 24 within base 14 is connected to an appropriate one of the wires 17 of cable 16, after which the interior of the base is filled with a suitable potting material. This preferably is done at the location where bases 14 are fabricated.

As is best shown in FIGS. 8, 10 and 11, the part of each connector 24 above base 14 has longitudinally extending opposite side edge portions 26 that constitute primary spring elements of the connector. (Connector 24 further has an upper edge portion 28 that interconnects the upper ends of side edge portions 26 and stiffens them to such an extent as to eliminate the need for "stop" members that limit outward movement of edge portions 26. A service wire entry opening 30 in adjacent underlying relationship to upper edge portion 28 extends transversely through each connector 24. Lower edge portions 31 of opening 30 have upwardly facing sharp cutting surfaces. A vertical slot 32 within the central part of connector 24 communicates at its upper end with opening 30 and extends downwardly from it. Slot 30 decreases in width from its upper to its lower end, and terminates above an upwardly extending pointed impaling element 34 of the connector. The opposite sides of slot 32 are bordered by confronting edges of elongate secondary spring elements 38 that extend downwardly in cantilever fashion from the upper part of connector 24, have free rounded lower ends, and are bordered along most of their length by a generally kidney-shaped opening 42 of connector 24. During use of connector 24, spring elements 26, 38 undergo resilient lateral bending movement. The secondary spring elements 38 also undergo torsional flexure about their longitudinal axes. A contact element 44 having a downwardly sloping upper surface projects outwardly from each connector 24 below impaling element 34.

The illustrated connector 24 is particularly suited for use with insulated service wires ranging from eighteen and one-half gauge copper coated steel conductors through twenty-four gauge solid copper, and has a thickness of about twenty-thousandths of an inch.

The entry opening 30 of each connector 24 is adapted to receive service wires 46 as heavily insulated as that shown in FIGS. 1, 3, 4, and 10, or as lightly insulated as that of the service wire shown in FIG. 11. Whether heavily or lightly insulated, the service wires 46 introduced into entry opening 30 of a connector 24 preferably define an entry angle with the connector that is substantially less than 90° and preferably is about 30°.

Figures 10A, 10B, 10C:
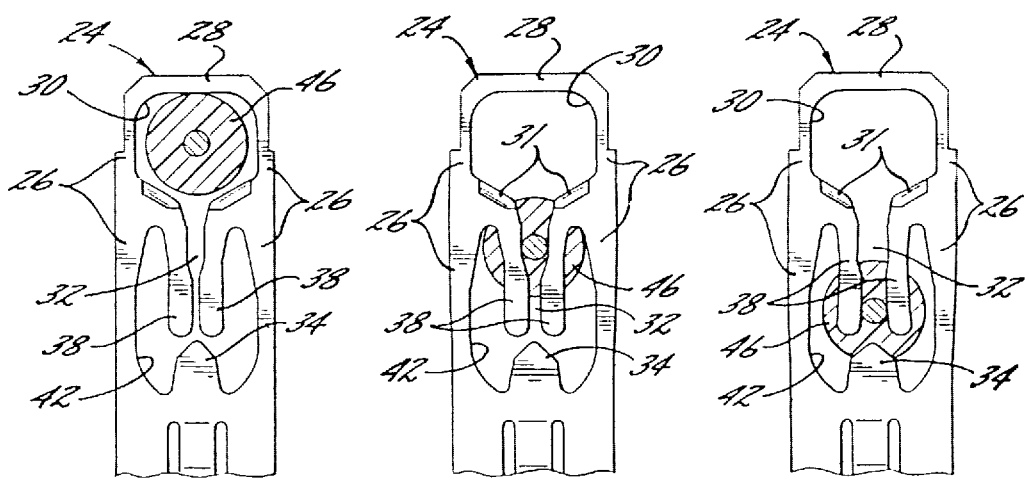
FIGS. 10a, b, and c are fragmentary front elevational views of the insulation displacing connector of FIG. 8 showing sequential positions occupied by a heavily insulated service wire during movement thereof from an upper part to a lower part of the connector.

Referring now particularly to FIGS. 10a, 10b and 10c, the relatively heavy insulation of the illustrated service wire 46 introduced into opening 30 and then moved downwardly therefrom is initially cut by the sharp edges 31 adjacent the bottom of opening 30. As service wire 46 is displaced downwardly into and through slot 32, the thereto adjacent confronting edges of secondary spring elements 38 engage, as shown in FIG. 10b, the central metal conductor of service wire 46. Final downward movement of the service wire impales its insulation upon the pointed impaling element 34 underlying slot 32, as shown in FIG. 10c. Movement of the heavily insulated service wire 46 into and through slot 32 deflects spring elements 26, 38 outwardly, and also causes torsional deflection of secondary spring elements 38. The torsional deflections of spring elements 38 contribute significantly to the fact that such elements are not strained beyond their elastic limits by passage of heavily insulated service wires 46 through slot 32. Upon return movement of service wire 46 upwardly to opening 30 the spring elements therefore resiliently return to their undeflected positions shown in FIGS. 8 and 10a.

When the service wire 46 is relatively lightly insulated, such as shown in FIGS. 11a, 11b and 11c, downward movement thereof from entry opening 30 into slot 32 occurs with little if any engagement between wire 46 and sharp edges 31 of opening 30. Substantially all of the cutting of the insulation of the lightly insulated service wire is done by the confronting edges of secondary spring elements 38. The primary spring elements 26 undergo little if any deflection, and the lowermost position of the lightly insulated service wire 46 is considerably above impaling element 34, as shown in FIG. 11c. Service wires having insulation of a size intermediate that of the illustrated heavily and lightly insulated wires 46 will produce spring element deflections intermediate those produced by the wires shown in FIGS. 10 and 11.

Wires 17 of cable 16 are illustratively received within and connected to the lower end section of respective ones of connectors 24, illustratively by generally T-shaped insulation displacing slots 19 provided in connectors 24. The aforesaid connection preferably is made in the facility where the base 14 is manufactured, and is preferably there surrounded by protective potting material shown in the lower part of FIGS. 3 and 4.

A plurality of driver modules 50 is mounted in laterally adjacent relationship to each other along the length of base 14 for vertical movement relative to the illustratively horizontally extending base and to each other between a first, illustratively upper position and a second, illustratively lower position. The modules preferably are formed of transparent durable dielectric plastic such as LEXANR. Each module 50 is cantilever mounted upon a rearward part of base 14 by mounting means that includes a mounting chamber 54 that is of U-shaped configuration as viewed in top plan and that is located within the rear part of the module. The mounting means further includes an underlying mounting post 56 that is of complementary U-shaped configuration and that extends upwardly from base 14 into the therewith vertically aligned chamber 54. The mounting means further includes a rotatable fastener 58, which illustratively and preferably is a threadformaing screw having a driver head that overlies the upper surface of chamber 54. A threaded shank of fastener 58 extends through a bore 60 in the chamber's top wall, a captive washer 61 and into an initially unthreaded axially aligned bore within the post 56 underlying chamber 54. Rotation of fastener 58 in the appropriate "tightening" direction forms screw threads in the bore of post 56 and drives module 50 downwardly from its upper position shown in FIG. 3 to its lower position, shown in FIG. 4, wherein the upper wall of chamber 54 abuts the upper surface of mounting post 56. Return upward movement of module 50 is effected, when desired, by reverse rotation of fastener 58. Canting or tilting of module 50 during and following vertical movement thereof is prevented by, among other things, sliding engagement between the exterior surfaces of mounting post 56 and the complementarily shaped confronting inner surfaces of mounting chamber 54.

Figure 3:
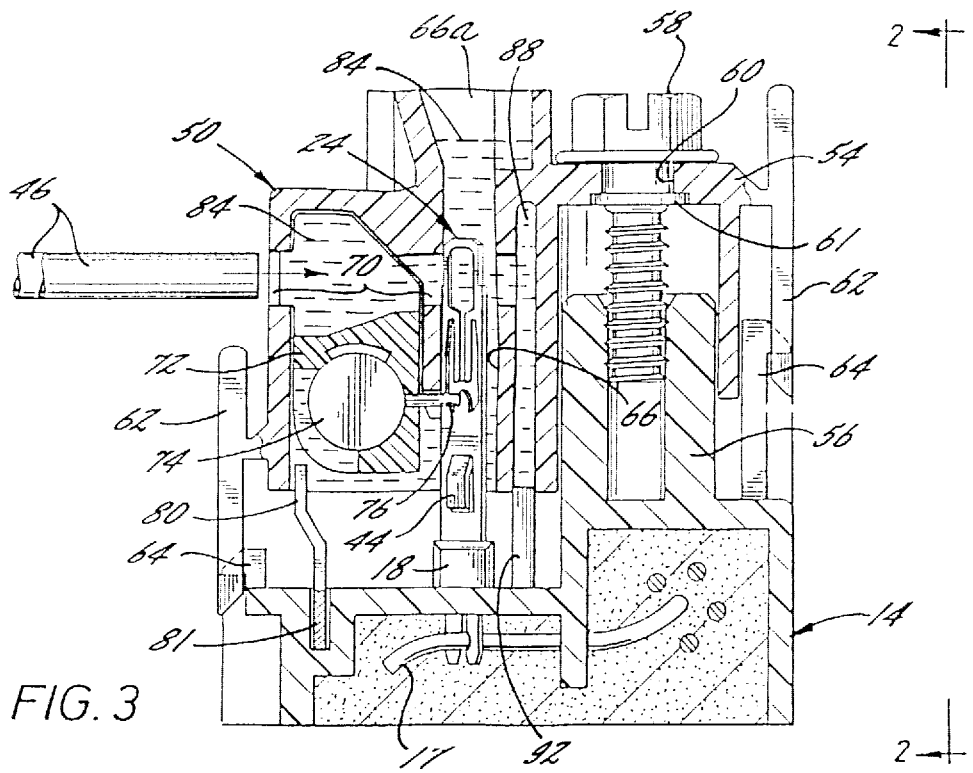
FIG. 3 is an enlarged vertical section taken substantially along the line and in the direction of the arrows 3—3 through the rightmost driver module of FIG. 1, which is shown in its upper position, the associated service wires being shown at a location preliminary to their insertion into the module.
Figure 4:
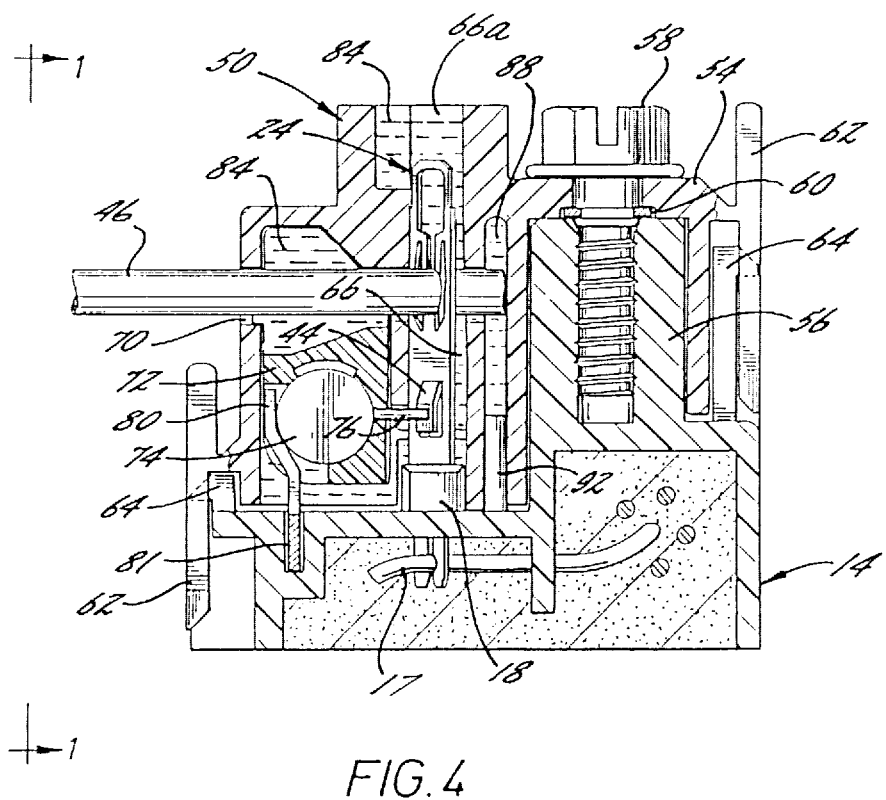
FIG. 4 is a view similar to FIG. 3, but taken in the direction of the arrows 4—4 of FIG. 1 and showing the driver module and service wires in their lower positions.

Engageable and disengageable latch means prevent inadvertent removal of each driver module 50 from base 14, while permitting movement of the module relative to the base from the module's upper position shown in FIG. 3 to its lower position shown in FIG. 4. The latch means includes resilient latch elements 62 that extend vertically in laterally spaced and generally parallel relationship to the front and rear surfaces of each module 50 and that are permanently connected intermediate their length to the module. The latch means further includes cooperating latch elements 64 that are connected to and extend forwardly and rearwardly from base 14. During initial installation of a module 50 upon base 14, downward movement of the module causes the lower end of each latch element 62 to engage a sloping cam surface upon an underlying latch element 64. The elements 62 are cammed outwardly by such engagement, and then resiliently return to a position beneath latch element 64. The latch elements 62, 64 then permit movement of the module 50 between its upper position of FIG. 3 and its lower position of FIG. 4, but prevent inadvertent complete withdrawal of the module from base 14. The latches also provide tactile feedback, in the form of increased resistance to reverse rotation of screw 58, that lets a telecommunications craftsperson know when a module reaches its upper position. Tactile feedback indicating arrival of the module at its lower position is provided by then increased resistance to tightening rotation of fastener 58.

The first and second insulation displacing connectors 24 extending through and upwardly from each boss 18 upon base 14 are received within respective first and second laterally adjacent connector chambers 66 that extend vertically through each module 50. The two chambers 66 are laterally separated from each other along part of their height by a vertical barrier wall 90 best shown in FIG. 6. Wall 90 is formed of dielectric plastic material and overlies the wall 20 of the adjacent boss 18 upon base 14. Chambers 66 are forwardly of and in non-communicating relationship with the module chamber 54 through which fastener 58 extends. As is best shown in FIGS. 3 and 4, the width of each chamber 66 decreases with increasing distance from the lower end to the upper end of the connector 24 within the chamber. Adjacent its upper end each chamber 66 has a test port area 66a into which a connector 24 extends. The two connectors 24 within each module 50 lie in parallel laterally spaced vertical planes that extend in angular oblique relationship to a vertical plane containing the longitudinal axis of terminal block 12. When viewed perpendicularly to their major surfaces, i.e., in the direction of the arrow 68 of FIG. 7, the two connectors 24 of each pair have overlapping side edge portions. The aforesaid orientations of the connectors relative to each other and to base 14 contribute signficantly to the compact construction of terminal block 12.

First and second laterally adjacent passageways 70 extend through the front wall of each driver module 50 and into respective first and second ones of the chambers 66 containing insulation displacing connectors 24. When a telecommunication craftsperson inserts first and second service wires 46 as far as they will go into respective first and second ones of the passageways 70 of a module 50 occupying its upper position, the leading ends of the customarily black service wires extend into respective first and second ones of the module's chambers 66 and also into and through the entry openings 30 of respective first and second ones of the insulation displacing connectors 24 within chambers 66. The transparent construction of the module permits visual verification of the position of the wires, particularly when the module is either colorless or of a color other than black. When a module 50 is moved downwardly from its upper position to its lower position, illustratively and preferably by rotation in the appropriate direction of thread-forming fastener 58, each service wire 46 is moved downwardly into and through the slot 32 of the associated connector 24 to its final position adjacent the lower end of the slot and wherein its inner metallic conductor is in engagement with connector 24. The final position of a heavily insulated service wire 46 is below that of a lightly insulated wire. This is due to the fact that a lightly insulated wire is not engaged and moved downwardly by the upper surface of the surrounding passageway 70 until after module 50 has moved downwardly a significant extent. As previously noted, each heavily insulated service wire 46 is also impaled in its lowermost position by the connector's impaling element 34 which resists axial pull-out of the service wire.

Figure 5:
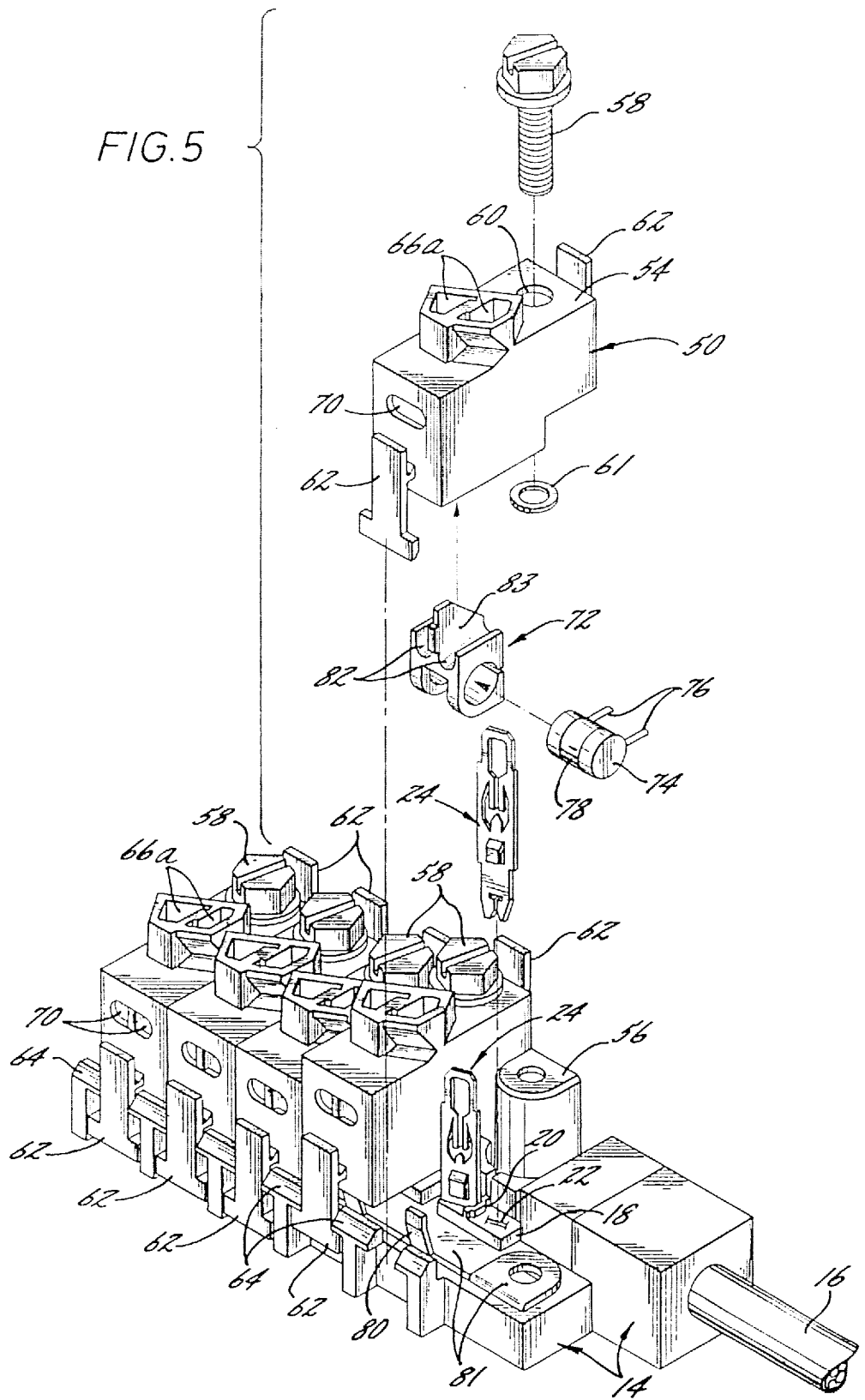
FIG. 5 is a front, right, top perspective view of the terminal block wherein the right-most driver module and components thereof are shown in exploded relationship.

Movement of module 50 to its lower position effects engagement of the lower end of each barrier wall 90 of the module with the upper end of the barrier wall 20 of the underlying boss 18 of base 14. Such movement of module 50 also downwardly displaces a component 72 thereof, best shown in FIG. 5, from its upper position shown in FIG. 3 to its lower position shown in FIG. 4. When surge protection is desired, the component 72 of each module contains a cylindrical fail-safe and vent-safe surge protector device 74. Device 74 has first and second tip and ring contacts 76 extending radially therefrom to locations respectively adjacent first and second ones of the insulation displacing connectors 24. Device 74 also has an arcuate ground contact 78 upon its cylindrical outer surface. As shown in FIG. 4, downward movement of component 72 and device 74 brings tip and ring contacts 76 into engagement with respective ones of the projecting contacts 44 upon first and second ones of the connectors 24, and also brings the contact band 78 of device 74 into engagement with an upwardly extending arm 80 of a ground bus 81 that is mounted upon and extends longitudinally of base 14. If for any reason surge protection is not desired, a device 74 not having a ground contact may be substituted for the illustrated device 74. The ungrounded device (not shown) preferably is of a color clearly different from that of the protector device 74. As is also shown in FIG. 5, the service wire passageways 70 of each driver module 50 are defined in part by first and second channels 82 that extend through and open from the upper portion of module component 72 upon opposite sides of a vertically extending partition 83 that laterally separates the service wires within respective ones of the channels.

As is best shown in FIGS. 3 and 4, viscous protective sealant material 84, which preferably is a gel of the type disclosed in U.S. Pat. Nos. 4,634,207 and 4,864,725, is provided within and substantially fills the chambers 66, passageways 70 and the space about component 72 of each driver module 50. In conjunction with barrier walls 20, 907 sealant 84 isolates the adjacent connectors 24 of a module 50 from each other and from the ambient environment, particularly when the module 50 occupies its lower position. Since the sealant 84 within the front lower part of module 50 then is closely adjacent base 14, such sealant and the underlying part of the base similarly isolate surge protector device 74 and the electrical contacts associated therewith from the ambient environment.

Movement of service wires 46 into and from a module may disturb the sealant material 84, particularly when the sealant is not a gel, and cause the formation of voids in it. Voids substantially reduce the protection afforded by the sealant. The protection decreases in proportion to the number of re-entries, and in prior terminal blocks using non-gel sealant may become deficient after a relatively small number of reentries.

In order to eliminate or at least substantially reduce the size of voids in the sealant material 84 within chambers 66, passageways 70 and other critical areas of driver module 50, the block is provided with sealant pump means. The pump means includes first and second sealant pump chambers 88 that extend upwardly through the bottom of each module 50 to an elevation at or (as shown) above that of service wire passageways 70, and that communicate with such passageways and through them with respective first and second ones of the module's connector chambers 66. Chambers 88 contain reserve sealant material. Each chamber 88 has an arcuate rear wall that slidably engages and conforms to the curvature of the arcuate front wall of the thereto adjacent post 56 upon base 14. The sealant pump means further includes first and second pump piston elements 92 that extend upwardly from base 14 and, when the overlying module 50 occupies its lower position shown in FIG. 4, into the open lower end portions of respective first and second ones of the module's pump chambers 88. Pump piston elements 92 each have peripheral front, rear and side surfaces that slidably and closely engage, and are complementary in shape to, the thereto confronting surfaces of the associated pump chamber 88.

After service wires 46 are inserted into an upwardly positioned module 50, downward movement of the module to its lower position of FIG. 4 causes pump piston elements 92 to enter the lower end portions of respective overlying ones of the module's pump chambers 88. This displaces reserve sealant 84 from pump chambers 88 into connector chambers 66, passageways 70 and other module areas (including that containing surge protector device 74) communicating therewith. Such displacement compresses the sealant material within the aforesaid areas and thereby eliminates or at least reduces the size of any voids therein. This highly desirable result occurs automatically, whenever a module 50 is re-entered, for as long as its pump chambers 88 contain sufficient reserve sealant.

When a driver module 50 occupies its lower position as shown in FIG. 4, the upper ends of connectors 24 are located below the upper surface of uppermost test port sections 66a of chambers 66, and below the upper surface of the sealant material 84 therein. A telecommunications craftsperson attaching a test clip to the upper part of connector 24 therefore must insert an end of the test clip into the sealant material and, upon completion of the circuit testing, withdraw the test clip from such material. Withdrawal of the test clip from association with a conventional insulation displacing connector, of the type having an open upper end, may cause withdrawal of some of the sealant material. Removal of sealant material 84 by a test clip applied to the upper end of one of the present insulation displacement connectors 24 is less likely to occur since the upper edge portion 28 of the connector resists movement of the sealant with the test clip as the clip is withdrawn.

Figure 9:
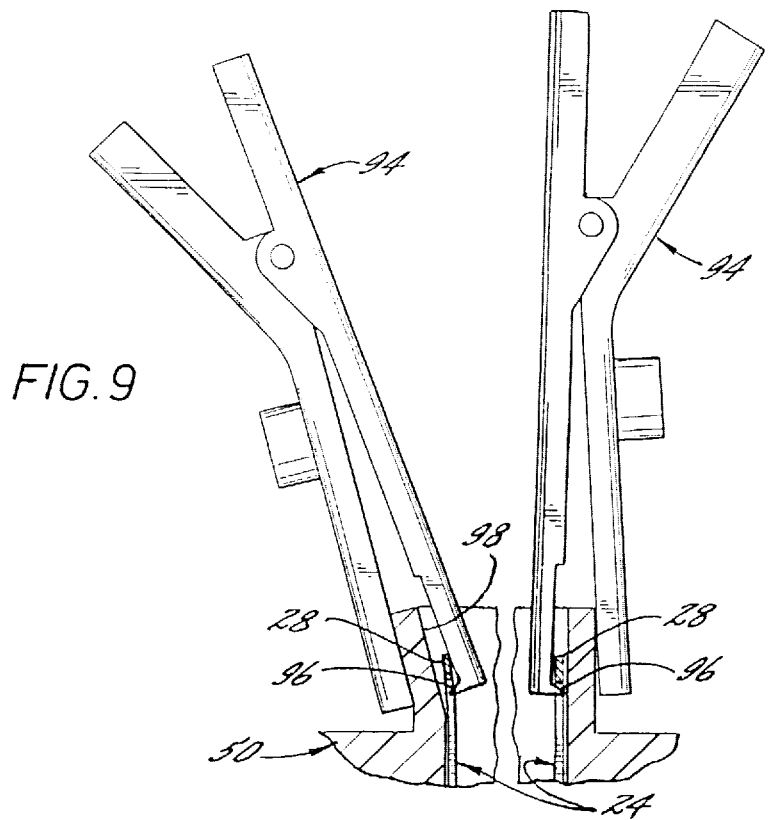
FIG. 9 is a laterally foreshortened view partially in elevation and partially in vertical section of test clips secured to upper end test port sections of driver module connector chambers and therein disposed insulation displacing connectors.

FIG. 9 shows test clips 94 that engage the upper edge portion 28 of connectors 24 and that each have a pin or tooth element 96 that extends into the opening 30 of the associated connector. This minimizes the possibility of inadvertent slippage of test clips 94 from connectors 24.

As is also shown in FIG. 9, the upper edge portion of at least one (illustratively the leftmost one) of the two connector chambers 66 of each module 50 preferably is provided with a sloping portion 98 which causes the test clip 94 secured thereto to extend angularly outwardly away from the central axis of such chamber and away from a test clip secured to the other chamber of the module. This minimizes the possibility of contact between and shorting of the test clips.

In addition to its previously discussed functions, the sealant material 84 surrounding and encapsulating surge protector device 74 protects the device's previously sealed air gap (not shown), or itself acts as a dielectric when present in the gap.

FIGS. 12–30 of the drawings relate to a ventsafe apparatus for gas tubes such as are used to protect telecommunications equipment from electrical interference or damage resulting from high voltage lightning pulses. A gas contained in the tubes ionizes at high voltages to divert such pulses to ground. The tubes also maintain a limited sustained ionization in the presence of a continuing high current overload, such as from an accidental power line crossover. To assure the performance of such tubes in the rare event that the ionizable gas vents from the tube, and to add protection in the case of overheat failure during sustained over-current conditions, prevailing industry practice is to require so-called "ventsafe" and "fail-safe" mechanisms along with the basic gas tube protector itself. (The term "vent-safe" now commonly refers to backup overvoltage protection if the gas "vents" or is lost to the atmosphere. The terra "failsafe" now commonly refers to thermal overload protection, although the term taken literally cloaks this connotation.)

Fail-safe protection is now commonly afforded by a fusible metallic or plastic material that, when heated due to the energy from the current overload, yields to a biased shorting member to provide a permanent current shunt around the gas tube. Vent-safe protection is usually provided by an air gap in the external structure of the device. The air gap is carefully dimensioned to require a firing potential considerably above the normal firing potential of the gas tube itself, so that a properly functioning gas tube will prevent the air gap from firing. This is important since an overvoltage pulse usually fires harmlessly through a properly functioning gas tube, but may damage the air gap (which is intended only as a safety backup). Such air gaps are typically designed to fire at about twice the design firing voltage of the gas gap. An example of such a device may be found, for example, in U.S. Pat. No. 4,212,047 (Napiorkowski, issued Jul. 8, 1980).

Unfortunately, it has been found that air gap vent-safe protection schemes can become unreliable. Telecommunications installations are intended to remain serviceable, without attention or maintenance, for decades. Understandably, environmental conditions often cause the electrical characteristics of these air gaps to become unstable over such long periods of time. For example, penetration of moisture into the backup air gap lowers the discharge voltage level and ultimately leads to shorts. The insulation resistance between the signal conductors and ground deteriorates, hindering regular performance of the network. Corrosion can induce shorts and cause corrosive destruction of the mechanism. The reduced firing voltage of the air gap converts the gap from the secondary to the primary discharge path. Correct performance of the telecommunications network is thus compromised. These effects are most pronounced when the air gap is directly exposed to the atmosphere, suffering seasonal as well as daily environmental effects, and further becoming contaminated by air pollution, insect infestation, and so forth. Even when efforts are made to isolate the air gap from the environment, such as locating the device in a sealed container, it will be appreciated that, over a course of years, moisture often still finds its way into the air gap.

Previous efforts to resolve this problem have included configurations in which the internal, normally gas-filled space was designed to act as an air gap upon venting of the gas. However, manufacturers ran into problems meeting the close tolerances required of such devices. Other approaches included improving the quality control and tolerances for the air gaps themselves: film thickness, die cutting quality of the film, air-gap diameter, anti-humidity coating, and so on. This increased the cost and manufacturing difficulty for these already intricate devices, but still left them vulnerable to the effects of humidity. Similarly, efforts at encapsulation were unsuccessful, whether using waxes, potting compounds, conformal coatings, encapsulants, gels, and so forth, all of which tended to penetrate or migrate into the air gap and change the discharge voltage levels.

A need therefore remains for an improved gas tube vent-safe device that can readily and inexpensively be utilized in place of existing air gap vent-safe mechanisms, and which will be reliably environmentally stable over extended periods of unattended service life. Advantageously, the vent-safe device should also be functionally compatible with the latest environmental sealing and encapsulation technologies, such as gel encapsulation, to support advances in these technologies and to provide improved environmental isolation of the entire gas tube assembly. The present gas tube vent-safe apparatus fulfills the above needs and purposes. It provides a new and improved vent-safe apparatus for gas tube protectors, in which the air gap is replaced with a layer of solid material having particular non-linear electrical resistive characteristics. In the preferred embodiment, a solid, carbon black filled polycarbonate based extrusion grade compound is used. The film has a thickness from about 0.001 inch to about 0.010 inch or more, and preferably from 0.002 inch to 0.005 inch. The film is non-conductive, having an insulation resistance greater than $10^9$ ohms when placed between two electrodes, regardless of geometry. The breakdown voltage ($V_B$) of the film is greater than 600 and less than 1000 volts, and can be controlled to a narrow band (e.g., $800<V_B<850$ volts, or roughly twice the design breakdown voltage of the gas tube), if desired. (Once a discharge has fired through the film, subsequent breakdown voltages tend to be lower). The initial breakdown voltage proves to be largely independent of contact -with encapsulating materials (e.g., silicone gel). Because the film is a thin (1 to 5 mil) insulating plastic, it can be readily substituted for the fusible insulating plastic films in existing designs, such as described in the '047 patent above. In addition to extreme environmental stability (even when immersed in water the breakdown voltage and insulative properties of the film do not change significantly), the invention significantly improves and simplifies manufacturing tolerances and procedures by eliminating the need to form precise holes and precisely position them in the gas tube vent-safe structure. The preferred plastic material has a high heat deflection temperature (ASTM D648), so that it avoids possible deformation during thermal exposure in manufacturing, and exhibits less creep under compression and during temperature cycling.

A major feature of the present invention has to do with the discharge mechanism itself. Filled polymer films have been used in other technical areas for discharging static electricity (e.g., such as used for discharging static electricity in small personal computers). See, for example, U.S. Pat. Nos. 4,977,357 (Shrier, issued Dec. 11, 1990) and 5,068,634 (Shrier, issued Nov. 26, 1991). However, these have been low energy applications where the devices were designed for reliable repeatability after many discharge events. That is, the performance had to be non-destructive. A major distinction, and an important new feature of the present invention, is the realization and expectation that the present device will perform in a manner which will be destructive to itself. By making this a feature of the present invention (which is acceptable since this is a backup device that normally should not be called upon to fire), the present invention can handle and discharge high voltage pulses having significant energy, such as caused by lightning pulses. In contrast, prior art devices in other technical applications have not been considered capable of handling such impulses. This has important implications. The actual discharge mechanism is a plasma which the high energy of the electrical pulse forms through the plastic film, once the plastic film begins to conduct. This plasma results in a nearly direct short to ground, which is required for effective protection in telecommunications protector devices, and closely mimics the performance of a normal gas tube. This sudden plasma-induced increase in conductivity (or reduction in resistance) provides a voltage foldback effect to an extent not seen in non-destructive static load situations, where similar films have been used in other technologies, as mentioned.

This leads to an additional advantageous feature of the present invention. In another preferred embodiment, the vent-safe gap (and preferably the entire gas tube device) is encapsulated in an environmentally sealing gel. A telecommunications terminal showing such a gas tube (but without the present vent-safe mechanism) encapsulated in a gel, is disclosed, for example, in U.S. patent application Ser. No. 776,501 (Baum et al., filed Oct. 11, 1991), assigned to the assignee of the present invention, the disclosure of which is incorporated herein by reference for all purposes. When a gas tube having a vent safe mechanism according to the present invention is thus environmentally sealed, the gel encapsulant advantageously protects the vent-safe mechanism from environmental contaminants, excludes oxygen from the region of the plasma discharge, and acts as a heat sink. This gel encapsulated plasma discharge substantially reduces the degradation of surrounding materials, prevents combustion, and draws thermal energy away from local hot spots. It is therefore an object of the present invention to provide new and improved methods and apparatus for providing vent-safe protection for telecommunications gas tube protectors, and more particularly for providing gas tube vent-safe methods and devices which include a first electrode for electrical connection to a terminal on the gas tube protector, a second electrode for electrical connection to another terminal on the gas tube protector, and a non-gaseous, non-linear resistive material separating the electrodes, the nonlinear resistive material being substantially non-conductive when the electrical potential between the electrodes is less than a predetermined breakdown voltage $V_B$, being conductive when the electrical potential is greater than $V_B$, and supporting a plasma discharge therethrough after becoming conductive to effect a sudden increase in conductivity between the electrodes for discharging high energy with a plasma voltage foldback functionally analogous to the foldback behavior of the gas tube protector; wherein the first electrode may be at least a portion of the first gas tube terminal and thus located thereon; wherein the predetermined breakdown voltage $V_B$ may be greater than the designed breakdown voltage of the gas tube protector at least prior to the first discharge through the non-linear resistive material; wherein the non-linear resistive material may be a solid, filled polymer film which is a composition comprising a polymer and, dispersed in the polymer, a particulate conductive filler; wherein the film may be a carbon black filled polycarbonate based extrusion grade compound having a thickness from substantially 0.001 to 0.010 inches or more, and preferably from 0.002 to 0.005 inches; wherein the particulate conductive filler may be carbon black, the primary size of the bulk (90%) of the carbon black filler being in the 30 to 60 nanometer range and the total carbon black content being 3 to 50% by weight of the total composition; wherein the electrodes and the non-linear resistive material may be environmentally encapsulated to protect them from environmental contaminants, to exclude oxygen from the plasma discharge, and to act as a heat sink to draw thermal energy away from local hot spots; wherein the encapsulant may be chemically inert to the film material; wherein the encapsulant may be a gel; which may include a third electrode for connection to a third terminal on the protector; wherein at least part of at least one of the electrodes may be at least partially rolled away from another of the electrodes; and to accomplish the above objects and purposes in an inexpensive, uncomplicated, durable, versatile, and reliable method and apparatus, inexpensive to manufacture, and readily suited to the widest possible utilization in telecommunications protector circuits.

Figure 12:
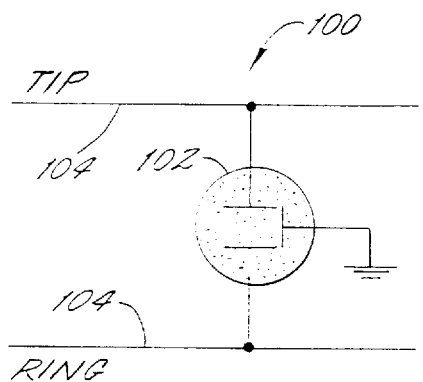
FIG. 12 is a schematic illustration of a circuit having typical three-element gas discharge tube and a one-pair telecommunications line.
Figure 13:
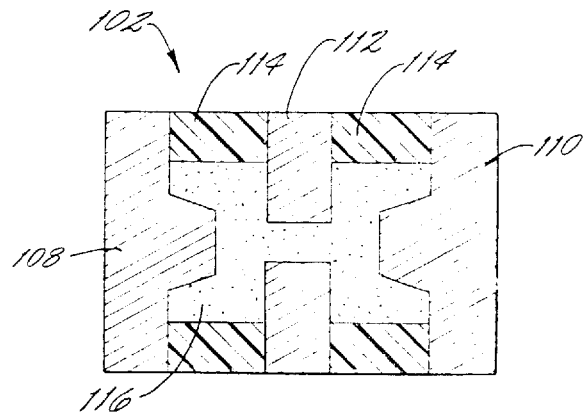
FIG. 13 is a sectional view of the gas tube of FIG. 12.

With reference to the drawings, the new and improved gas tube vent-safe method and device for telecommunications systems will now be described. FIG. 12 schematically illustrates a typical telecommunications circuit 100 incorporating a gas tube 102 in a telecommunications line 104. The gas tube protector 102 has end terminals 108 and 110 (FIGS. 13 and 16) for connection to the tip and ring sides of the telecommunications circuit, and a center ground terminal 112. The main body of the gas tube protector 102 is a durable plastic or ceramnic shell 114 (FIG. 13). The interior of the tube 102 contains an ionizable gas 116 which ionizes to form a discharge plasma at a predetermined design potential, such as 350–450 volts, as indicated in FIG. 15.

Figure 14:
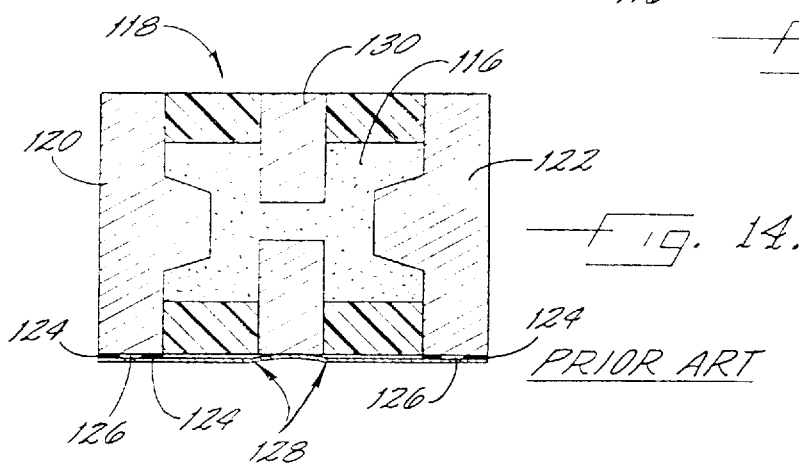
FIG. 14 is a sectional view of a known type of gas tube equipped with an air-gap type of vent safe device.

FIG. 14 shows a typical prior art air gap gas tube vent-safe device 118. The end terminals 120 and 122 of device 118 also function as the electrodes for the air gap vent-safe operation. Each of the end terminals/electrodes 120, 122 has a non-conductive film 124 that is perforated by holes 126 and which separates the electrodes 120, 122 from a ground electrode 128 which is connected to the center ground terminal 130 of the gas tube 118. As already indicated, such air gap vent-safe mechanisms are well known.

Figure 15:
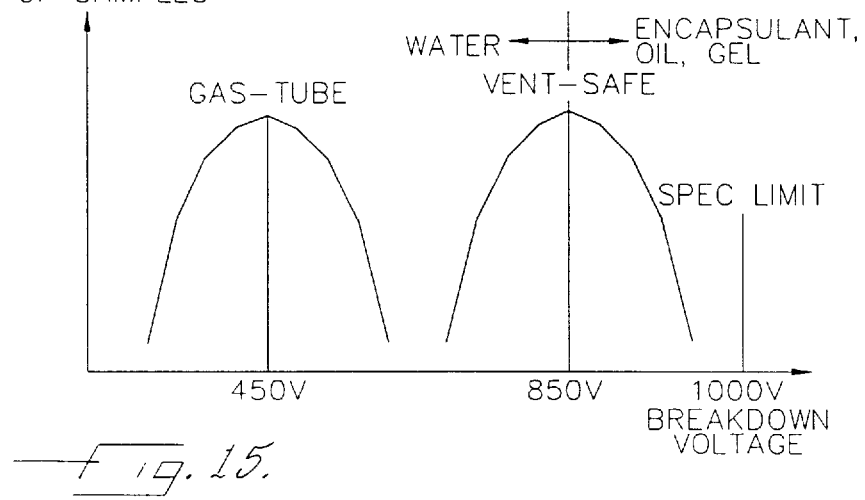
FIG. 15 is a diagram of the effect of oil and water upon the breakdown voltage of the air-gap vent safe device shown in FIG. 14.

FIG. 15 illustrates the typical breakdown voltage $V_B$ for a gas tube (usually around 350–450 volts), and the corresponding breakdown voltage for the air gap vent-safe system 118. As illustrated by the arrows in FIG. 15, pointing respectively left and right, water which invades the holes 126 will reduce the breakdown voltage of the air gap vent-safe device; oil will increase it. Thus, the deleterious effects of environmental pollution, humidity, insect infestation, etc., can cause the air gap vent-safe device 118 to start firing at voltages comparable to those of the gas tube. This is effectively a system failure. On the other hand, efforts by the present inventors to seal the holes 126 from environmental effects by gel encapsulation, for example, have inevitably resulted in oil bleeding from the gel into the holes 126. This adversely raises the breakdown voltage beyond the specification design limit.

The gas tube vent-safe device 138 illustrated in FIGS. 16–19 overcomes these prior art limitations. In particular, the insulating film 134 is solid, not perforated. Thus, it is essentially immune to environmental contamination. Similarly, it can readily be encapsulated, such as in a gel 136 (FIG. 21), without changing the design breakdown voltage of the device. Encapsulant 136 is selected of a material which is chemically inert to the film 134. For example, when the film is a polycarbonate, a silicone gel would be appropriate.

In the embodiment illustrated in FIGS. 16–19, the end terminals 108 and 110 of the gas tube protector device 102 also function as electrodes for the vent-safe components of the device. On the side of the film 134 opposite the electrodes 108 and 110 is a ground electrode/film retainer 140 connected to the ground terminal 142 on the gas tube. Further improvement of vent-safe performance is realized by judicious geometric design of the supporting ground electrode/film retainer 140 (FIG. 18) to produce controlled uniformity in the electric field which is developed throughout the film material 134 between the ground electrode 140 and the opposing gas tube electrode 108, 110 before and during breakdown. If no special attention were paid to this aspect, the possibility of high variance in $V_B$ exists. For example, in certain existing vent-safe designs, sharp edge discontinuities occur on certain stamped metal parts, producing uncontrolled field non-uniformity. Even when other parameters such as spacer material thickness and/or perforation hole diameters in certain air gap designs are tightly controlled, slight manufacturing differences in electrode material edges of improper design can yield unacceptable $V_B$ variance. Consequently, the preferred embodiment of the present invention incorporates such geometric design (in addition to the film material) in order to further improve performance. In FIG. 18, the ends 144 (only one of which is shown) of the ground electrode 140 are partially rolled away from the opposing gas tube electrode. This carries the sharp edge discontinuities of the ground electrode 140 away from the curved surface of the gas tube electrode, thus reducing localized field enhancement in the vicinity of the edges and producing smooth curved electrode surfaces at the minimum separation distance of the opposing electrodes. It also renders the part both simple to manufacture, without extreme tolerance constraints, and affords controlled, repeatable field uniformity for improved performance.

Device 138 may also be provided with electrodes which are distinct from the terminals 120 and 122 and are electrically connected thereto, such distinct electrodes also being located on the side of the non-linear resistive film 134 opposite the ground electrode. FIG. 20 illustrates such an alternative gas tube vent-safe device 148 having electrodes 150' and 152' respectively electrically connected to the gas tube end terminals 150 and 152, and a ground electrode 140 connected to the gas tube ground terminal 112. Electrodes 150, 152, in a fashion similar to device 146, are separated from ground electrode 140 by a film 154 which illustratively is the same as film 134.

FIG. 21 shows the gas tube vent-safe device 102 encapsulated in an environmentally protecting sealing gel 136. The gel encapsulant 136 not only protects the device 102 from the environmental contaminants, but also excludes oxygen from the region of the plasma discharge and conducts heat away therefrom (acting as a heat sink). This substantially reduces the degradation of surrounding materials, prevents combustion, and attenuates local hot spots. Such gels are preferably selected from materials which are chemically inert to the film material 124, 134. Proper selection of the gel material may also promote gradual, partial "healing" of the film 124, 134 in the damaged region of a plasma discharge as the oil filler in the gel migrates to that region of the film.

The non-linear resistive films 124 and 134 are selected of a material which is substantially non-conductive when the electrical potential between the electrodes is less than the desired breakdown voltage $V_B$. The film is thus non-conductive in that state, having an insulation resistance greater than $10^9$ ohms. Preferably, for telecommunications devices, the breakdown voltage $V_B$ is greater than 600 and less than 1000 volts, and particularly in the vicinity of 800–850 volts.

In analyzing and developing a suitable nonlinear resistive film, it was discovered that a homogeneous distribution of a rising electrical field can be obtained through the dispersion of small conductive particles in a non-conductive matrix, e.g., carbon black in a polymer. This in turn leads to more controllable high voltage discharges through solid materials. Nonlinear resistive materials are already used as electrical stress dissipating layers at abrupt transitions in high voltage applications.

Suitable non-linear resistive materials are prepared from a composition which comprises a polymer and, dispersed in that polymer, a particulate conductive filler. In order to achieve an insulation resistance in use of greater than $10^9$ ohms, the resistive material has a resistivity of at least $1 \times 10^6$ ohm-cm, preferably at least $1 \times 10^7$ ohm-cm, especially at least $1 \times 10^8$ ohm-cm. The type of polymer used is dependent on the desired physical properties of the resistive material in use, the type of particulate conductive filler, the anticipated use conditions, as well as other factors such as ease of manufacture, maximum exposure temperature, and chemical resistance. Either thermoplastic or thermosetting polymers may be used. Polymers which are particularly useful are those which can be formed, for example by extrusion, calendaring, casting, or compression molding, into relatively thin films, e.g., 0.001 to 0.010 inch (0.025 mm to 0.25 mm), and preferably 0.002 to 0.005 inch (0.05 mm to 0.13 mm). Particularly suitable polymers include polycarbonates.

Dispersed in the polymer is a particulate conductive filler, i.e., a material which has a resistivity of less than $10^{-1}$ ohm-cm, preferably less than $10^{-2}$ ohm-cm, particularly less than $10^{-3}$ ohm-cm. Among those particulate fillers which may be used are carbon black, graphite, metals, metal oxides, or any of these materials coated onto at least part of an insulating particle such as a glass or ceramic particle. A single type of particulate filler may be used or the resistive material may comprise a mixture of two or more different fillers or two or more different sizes or types of the same filler. Generally particulate conductive particles which are suitable for use in the invention have an average particle size, i.e., the size of the primary particle, of less than 1 μm, preferably less than 0.5 μm, particularly less than 0.1 μm, e.g. 0.01 to 0.09 μm. For some compositions, it is preferred that the majority of the particles of the particulate filler, i.e., at least 50%, preferably at least 60%, particularly at least 70%, especially at least 80%, have an average particle size of 0.01 to 0.09 μm, preferably 0.02 to 0.08 μm, particularly 0.03 to 0.07 μm. If the particles are fused or otherwise associated in the form of an aggregate, e.g. as carbon black is, it is preferred that the aggregate size be less than 5 μm, preferably less than 3 μm, particularly less than 2 μm, e.g., less than 1 μm. Depending on the type of particulate conductive filler and its structure, particle size, density, and conductivity, the amount of particulate conductive filler in the resistive material is 3 to 70% by weight of the total composition, preferably 3 to 50% by weight, particularly 15 to 45% by weight, especially 20 to 40% by weight. When the particulate conductive filler is carbon black, the amount is often 3 to 50% by weight of the total composition, particularly 3 to 35% by weight, especially 3 to 10% by weight.

The above criteria were met during experimentation with non-linear resistive film materials from LNP Engineering Plastics Inc. (Exton, Pa.), available under the trade name "Stat-Kon." One suitable material was Stat-Kon DX7, a carbon black filled polycarbonate based extrusion grade compound with volume resistivity between 10E7 and 10E12 ohm-cm. Films were obtained at a 10 mil thickness and measured 10E7 ohms in insulation resistance at 250 vdc using the film thickness as electrode separation. In fact, any location of the two electrodes on the film always gave the same insulation reading. Thinner films were obtained by compressing the 10 mil film on a hot press down to 2.5 to 4.0 mil.

As a test, these 2.5 to 4.0 mil films were inserted between the metal spring terminal/contact accessories of commercially available three-element gas tube integrated vent-safe/fail-safe protectors and tested for performance according to Bellcore TR-TSY-000073, which Bellcore specification is incorporated herein by reference for all purposes. Insulation resistance as measured in the device remained at the high levels as measured before on the film only, and the tip-to-ground or ring-to-ground breakdown voltage of the vented gas tube protector (through the thin film) varied from 700 volts to 900 volts, whether or not encapsulated in silicone gel. However, gel encapsulation substantially reduces the oxygen source needed for combustion, and it acts as a heat transfer medium to effectively draw the thermal energy away from local hot spots. In this way, a smooth and safe operation is secured during these high energy transfers, substantially reducing the degradation of surrounding materials (gel encapsulated plasma discharge). As encapsulated in silicone gel, there was no interference with the fail-safe mechanical spring mechanism during a power-cross test (1A, 1000V, 60 Hz), a homogeneous heating took place without visible sparking or material degradation, and the metal spring moved through the melting polycarbonate film to form a metalto-metal contact, dumping the current to ground.

Figure 23:
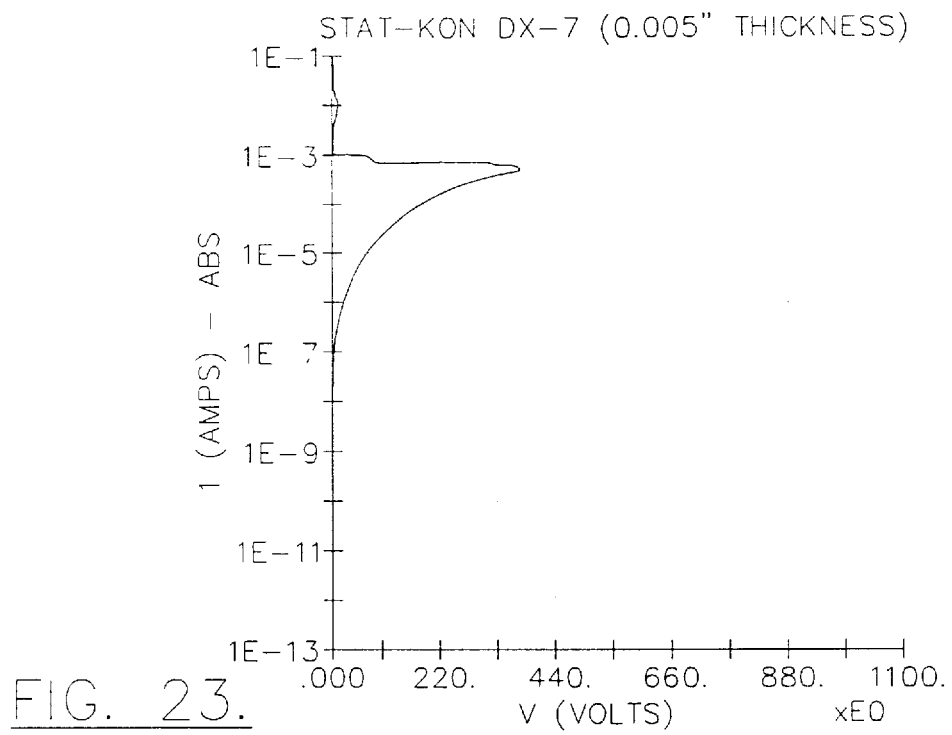
Figure 24:
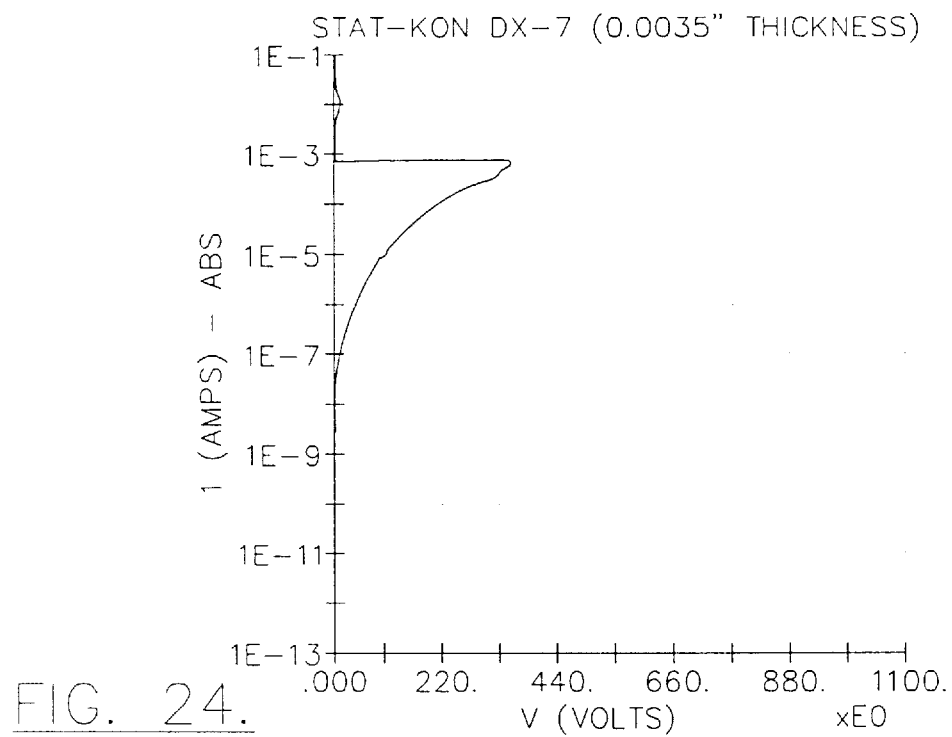

FIGS. 22, 23 and 24 depict the IV-curves for Stat-Kon DX7 films of different thicknesses. The interesting and very useful features of a Stat-Kon DX7 type material are that the breakdown voltage levels remain relatively independent (as compared to an air gap) from the film thickness, the insulation resistance remains at a high level, and for thin films around 3 mil, the trigger current is in the micro amp range.

Figure 25:
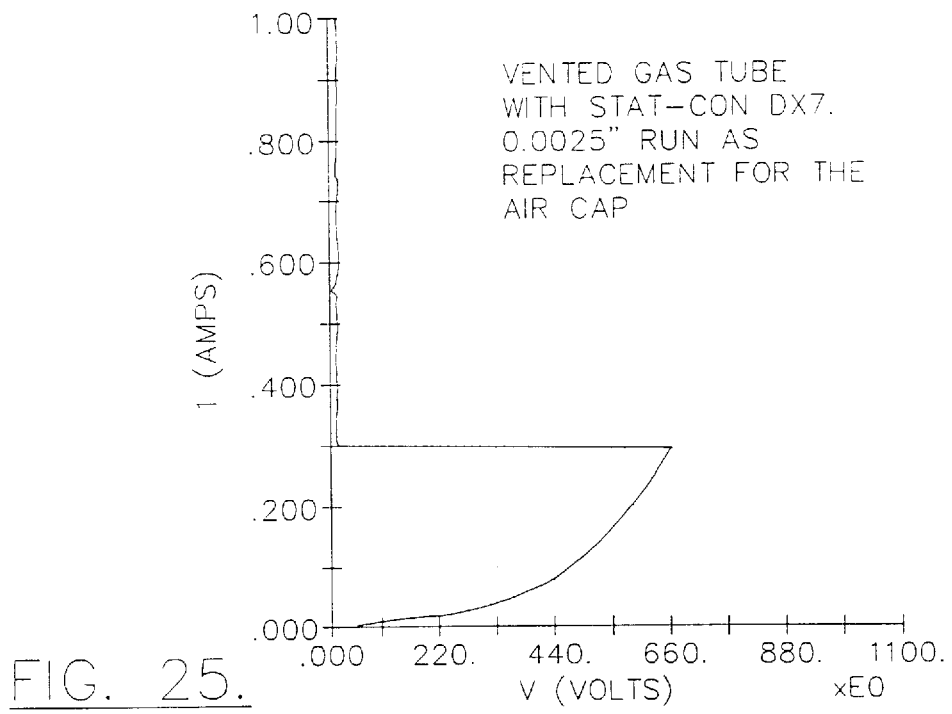
FIG. 25 is the IV curve for a gas tube vent safe device of the construction shown in FIGS. 15–18 and used as a replacement for the air-gap of a commercially available three element gas tube vent safe device.
Figure 26:
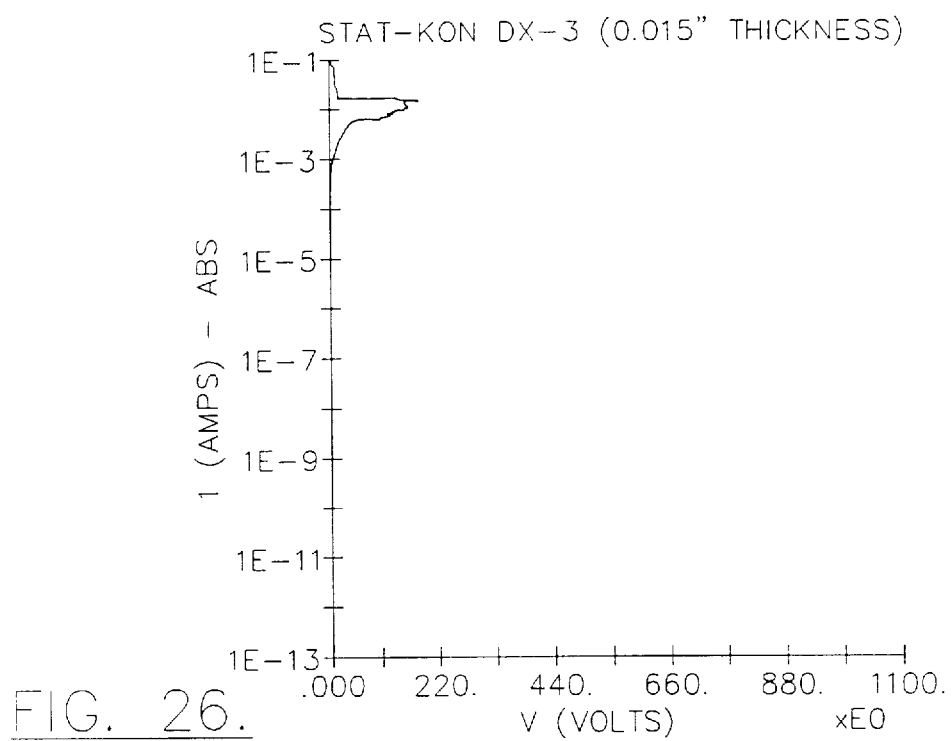
FIG. 26 is the IV curve for a more conductive film.

FIG. 25 shows the IV-curve of a 2.5 mil pressed Stat-Kon DX7 film as replacement for the air gap of a commercially available three-element gas tube vent-safe device. FIG. 26 depicts the IV-curve for the more conductive 15 mil Stat-Kon DX3 film (resistivity 103 to 106 ohm-cm). Having an insulation resistance around 10E6 Ohms makes the DX3 film less preferable for telephone circuit applications.

Figure 27:
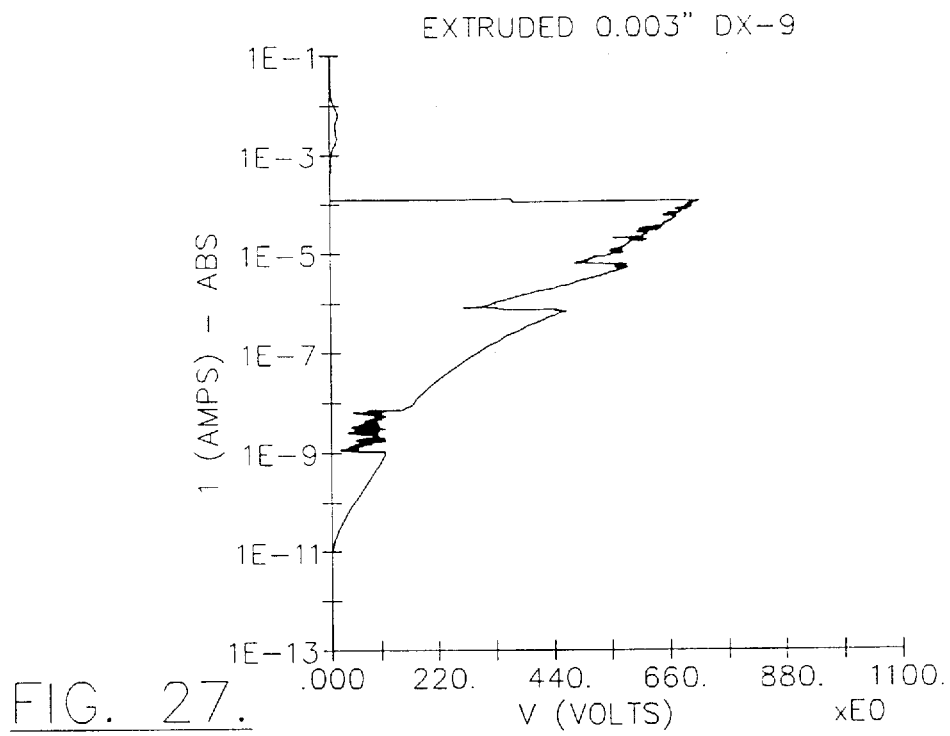
FIG. 27 is an IV curve for a commercially available film.
Figure 28:
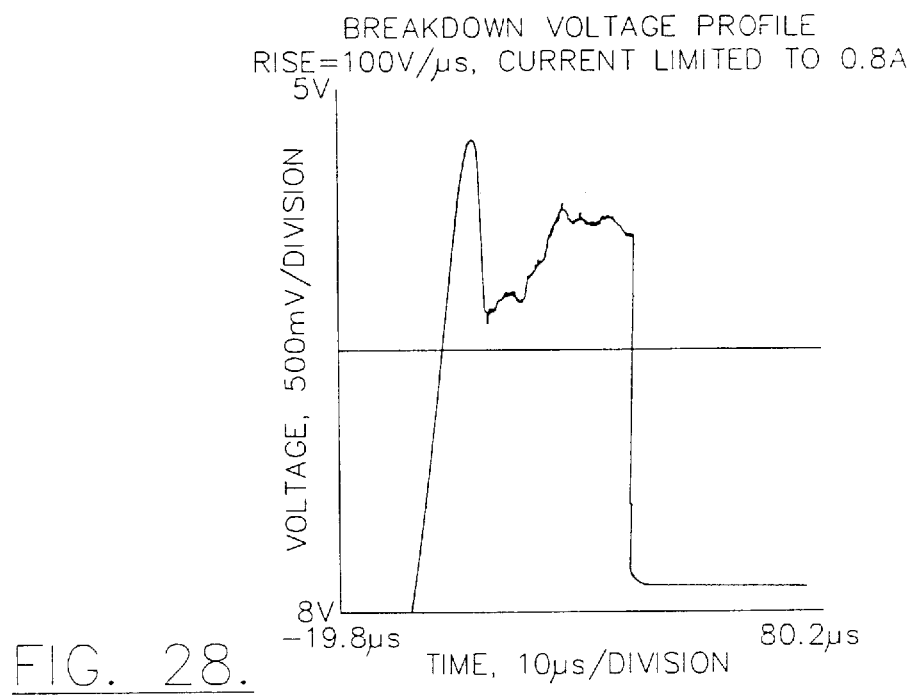
FIGS. 28–30 depict the electrical impulse breakdown behavior of the FIG. 27 film as a function of current loading.
Figure 29:
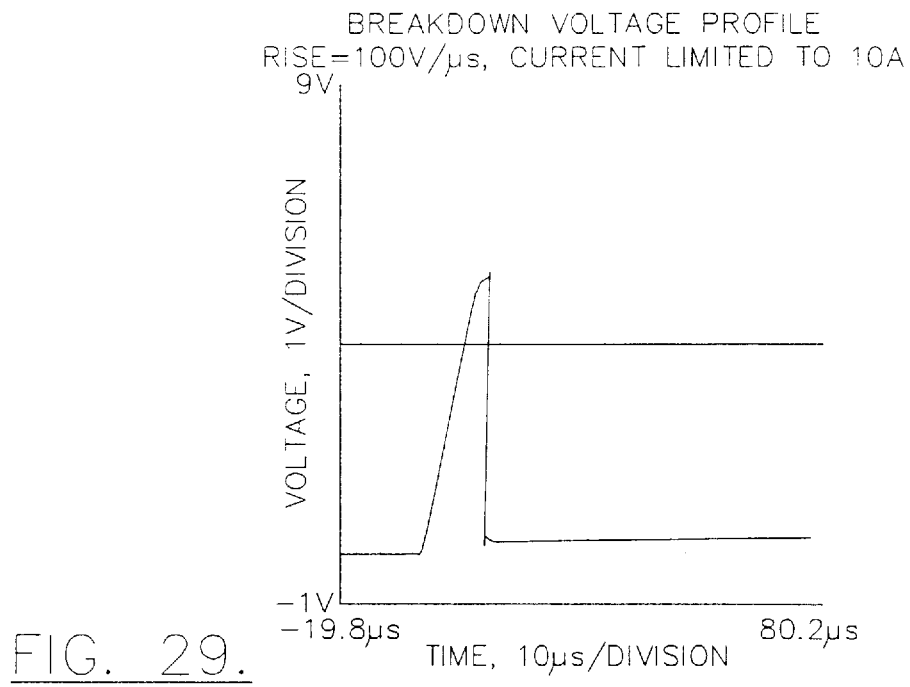
Figure 30:
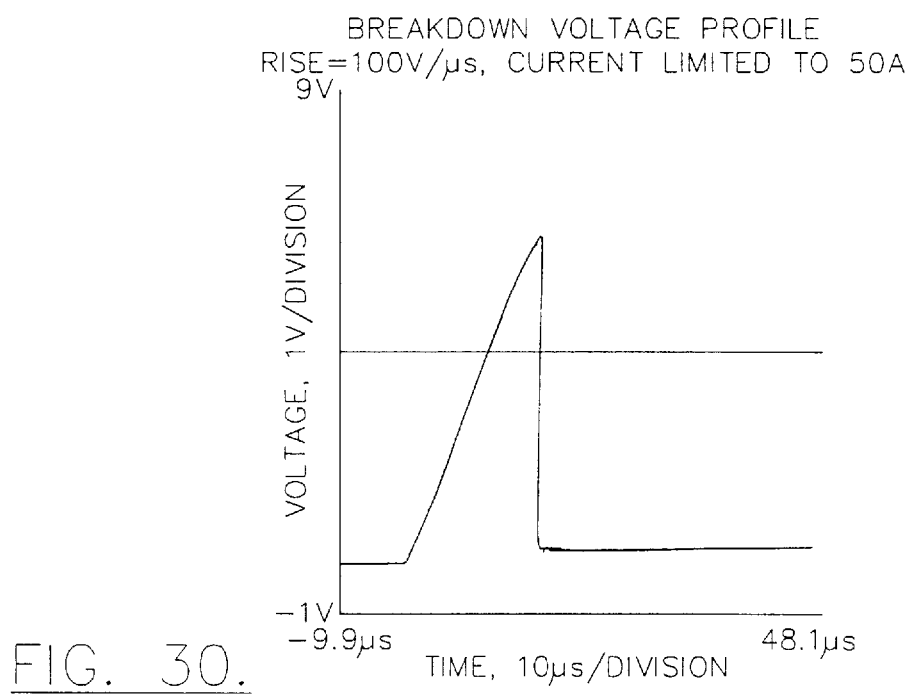
Figure 31:
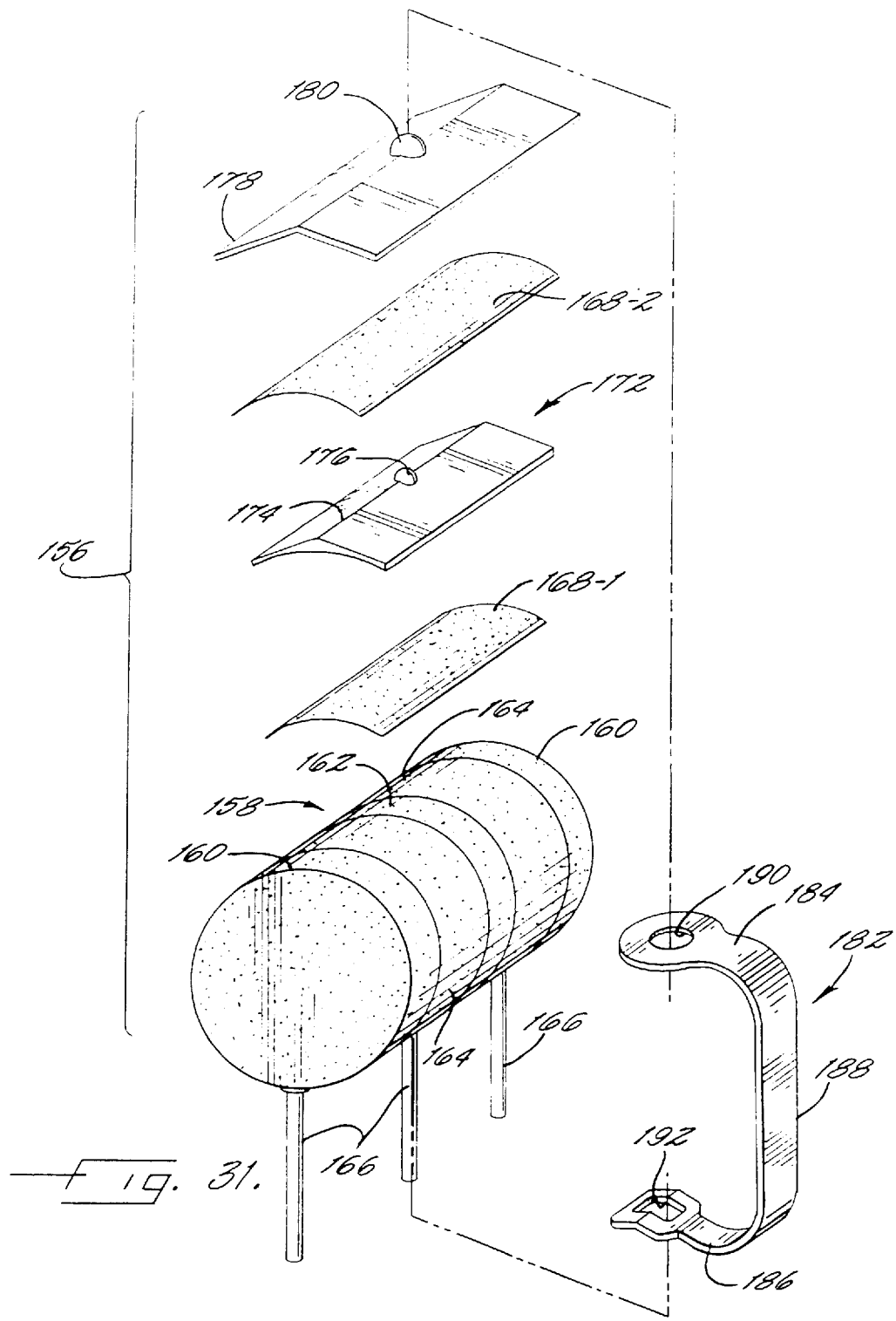
FIG. 31 is a vertically exploded perspective view of a surge arrestor having a fail-safe thermal overload mechanism in accordance with the invention.

As pressing of thin films lead to inconsistencies with regard to film thicknesses and electrical parameters, extrusion of thin films was pursued using polycarbonate based compounds with carbon black loadings from 3% to 10%. The carbon black used had a primary particle size mostly below 75 nanometers and an aggregate particle size centered around 0.5 microns. An example of such a film is the Stat-Kon DX9 material (resistivity 109 to 1012 ohm-cm). FIG. 27 depicts a typical IV-curve for this material. FIGS. 28–30 depict the electrical impulse breakdown behavior as a function of current loading for this material. Material analysis of a single sample from the trial extrusion indicated that the material comprised 3 to 10% by weight carbon black with a particle size of 0.030 to 0.069 nm, 65 to 70% by weight bisphenol-A-polycarbonate, and 1 to 3% by weight other filler.

As may be seen, therefore, the vent-safe apparatus of the present invention provides numerous advantages. Principally, it provides an environmentally stable apparatus for a telecommunications gas tube protector. By eliminating the conventional air gap, and especially when encapsulating (such as in a gel) the breakdown voltage $V_B$ remains reliably stable over very extended periods of time. Once the gas tube fails and the present invention fires in its place, this will, of course, damage the film 134 in the region of the discharge. The inability of such non-linear resistive films to repeatably conduct such high currents without damage has heretofore been seen as an insurmountable barrier. As taught by the present invention, however, since under normal conditions the vent-safe apparatus of the present invention never fires, and the apparatus is intended to be replaced once the gas tube 102 has failed, damage to film 134 is acceptable. In fact, if the film carbonizes leaving a low resistance path, this may actually be advantageous since it will assist in identifying a failed gas tube. In other words, it has been recognized that, in this technology, repeatability can be sacrificed for performance and environmental stability. This is a major conceptual and functional breakthrough heretofore unavailable.

Of course, various modifications of the ventsafe apparatus are possible. For example, other nonlinear resistive materials having electrical characteristics similar to the preferred filled polycarbonate films may be found suitable. These can include non-gaseous, but not necessarily solid, materials such as, for example, suitable gels having the desired electrical properties. In a humid environment, a nonencapsulated carbon black filled nylon 11 film could be used instead, with excellent results. Since such a film is inert to mineral oil based gels and to silicone gels, it could be gelencapsulated as well. It also has a sharp melting point, for improved fail-safe performance in applications to be described below. In another modification, the vent-safe apparatus can be used with two element gas tubes, thus requiring only two electrodes on the vent-safe apparatus itself.

In addition to vent-safe mechanisms, gas tube surge arrestors frequently are also equipped with failsafe mechanisms. When an arrestor is subjected to a current surge condition over a long period of time, as might occur for instance due to a power line crossing, the heat generated by the arrestor may be sufficient to present a fire hazard. To prevent the foregoing, the fail-safe mechanism short circuits the current to ground when the arrestor is subjected to a thermal overload. A commonly employed means for establishing the short circuit includes a spring contact that is normally maintained in an inactive position by solder or other meltable material. When a thermal overload condition occurs, the material melts and permits movement of the spring to an active short-effecting position. In the aforesaid prior art arrestor the meltable material does not itself form the short circuit. However, U.S. Pat. No. 4,851,946 discloses a different type of fail safe thermal overload mechanism in which molten solder material directly forms a short circuit between ground and line electrodes when the arrestor is subjected to a thermal overload.

The fail-safe thermal overload mechanism of the present invention is similar to that disclosed in the above noted prior patent in that it employs solder material that melts and directly forms the desired short circuit when the arrestor is subjected to a thermal overload. The fail safe mechanism is highly reliable in operation and relatively inexpensive. In a preferred embodiment the fail safe mechanism includes solder flux upon the outer surface of the housing of the arrestor, a solder billet overlying the arrestor housing, and channel and spring members that overlie the billet and bias it to a location closely adjacent and preferably abutting the arrestor body. Solder flux may additionally or alternatively be provided upon the inner and/or outer surfaces of the solder billet, and/or within billet. A preferred flux is a rosin based one that under normal (i.e., no thermal overload) conditions, coats and protects the surfaces to which it is applied, and has good dielectric properties and acts as an insulator. When the solder melts under thermal overload conditions, the flux causes the molten solder to thoroughly wet surfaces of the arrestor housing and the channel member of the fail-safe mechanism so as to facilitate preferential flow of molten solder from the solder billet to one or more locations establishing a highly conductive, low resistance short circuit between the arrestor electrodes. When the arrestor housing is of cylindrical shape, as is customary, the channel member is preferably of generally Vshaped configuration and has first and second sections that extend angularly relative to each other and meet at an apex that overlies and extends generally parallel to the central axis of the arrestor housing. When the arrestor is subjected to a thermal overload, the channel member permits relatively free flow of molten solder from the solder billet in a first direction, which in the illustrative embodiment is generally parallel to the longitudinal axis of the arrestor housing, while limiting flow of the molten solder in a second, transverse direction.

Figure 38:
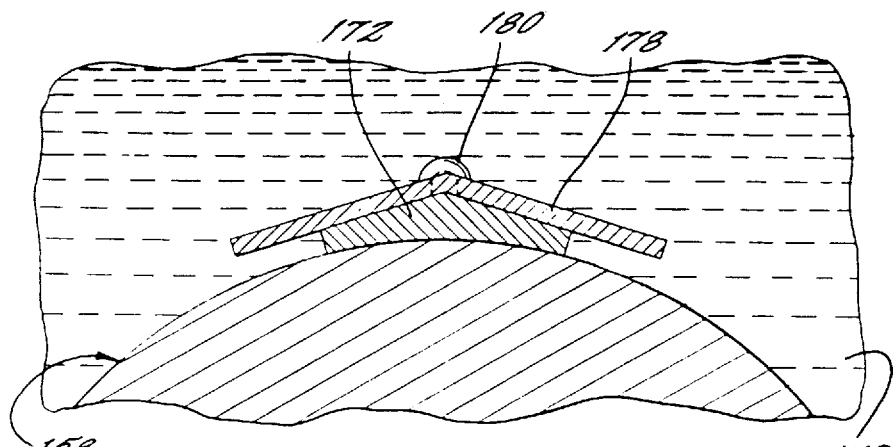
FIG. 38 is a view similar to FIG. 36 showing gel or other protective sealant material encapsulating the arrestor and components of the fail-safe mechanism.

Referring now to FIGS. 31–38 of the drawings, the surge arrestor 156 is illustratively of the type having a cylindrical housing 158 that includes diskshaped line electrodes 160 at its opposite ends, a disk-shaped ground electrode 162 intermediate the length of the housing, and insulating material 164 intermediate electrode 162 and each of the line electrodes 160. Arrestor 156 may and illustratively does further include pin-type lead elements 166 that extend from respective ones of the electrodes. At least some, and illustratively substantially all, of the exterior surface of housing 158 is overlaid by a film, foil or coating of solder flux material 168 which is indicated in the drawings by stippling. Flux material 168 is preferably of a rosinbased type that under normal temperatures of housing 158 has strong dielectric properties, and protects the housing and other members engaged thereby from contaminants and other materials such as soft textured encapsulants 170 (e.g., gels, oils, greases, etc.) such as shown in FIG. 38. Under thermal overload conditions the flux greatly facilitates flow of molten solder along the housing and other members engaged thereby. An example of flux of the foregoing type is that sold by Alpha Metals of Jersey City, N.J., under the type designation R100, and is comprised essentially of natural rosin, alcohol and in certain other formulations, proprietary activators.

A channel-shaped solder billet 172 overlies and extends longitudinally of the upper surface of housing 158. Billet 172 is illustratively of inverted V-shaped configuration and has opposite side sections that extend angularly downwardly from each other and from an apex 24 upon the upper surface of the billet. The undersurface of the billet preferably and illustratively has a concave contour complementary to the cylindrical outer surface of housing 158, and may have a film or coating 168-1 of flux 168 thereon. The thickness of billet 172 is greatest in the portion thereof underlying apex 174 and is of a lesser magnitude adjacent the opposite side edges of the billet. The upper surface of the billet has a semispherical protuberance 176 generally centrally thereof, and may have a foil, film or coating 168-2 of flux 168 upon such upper surface.

Alternatively or additionally, flux material 168 may be present upon the undersurface of a conductive channel member 178 of the thermal overload mechanism. In keeping with billet 172, member 178 is preferably of generally channel-like V-shaped configuration, and has opposite side sections that closely overlie the opposite side sections of billet 172. A centrally located semispherical socket 180 upon the upper surface of member 178 receives billet protuberance 176 and allows limited adjustive movement of billet 172 relative to member 178 and arrestor housing 168.

The aforesaid components of the fail-safe mechanism are secured to each other and to arrestor housing 158 by a generally U-shaped resilient spring member 182. Spring 1 82 has generally horizontallyextending upper and lower legs 184;, 186 that extend in parallel relationship to each other from a generally vertically extending section 188. Legs 184, 186 have vertically aligned openings 190, 192 adjacent their free outer ends. The center one of the conductive pins 166 of arrestor housing 158 extends downwardly through opening 192 of leg 186. Opening 190 of upper spring leg 184 receives the socket 180 of channel member 178, and permits limited adjustive movement of channel member 178 and underlying solder billet 172 relative to arrestor housing 158 and spring 182. Spring forces imposed by spring 182 upon the assembled components bias member 178 and billet 172 downwardly to a position wherein billet 172 is firmly seated upon the upper surface of arrestor housing 158.

Figure 36:
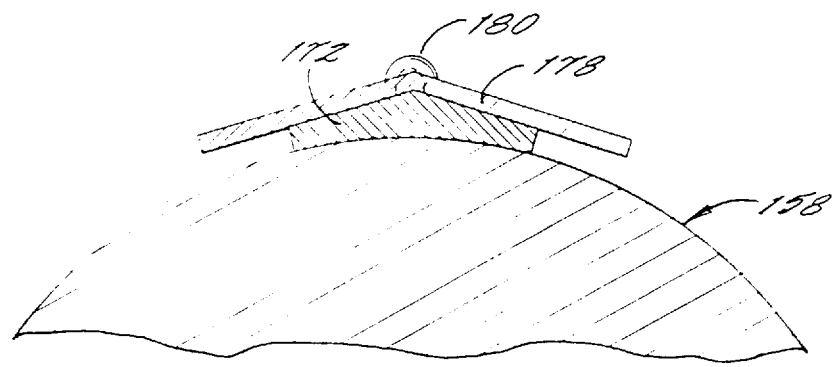
FIG. 36 is a fragmentary end view of the arrestor housing and of a solder billet and overlying channel member of the fail-safe mechanism.
Figure 37:
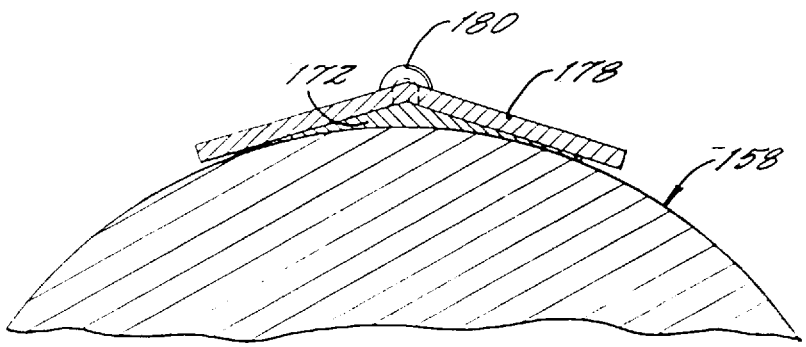
FIG. 37 is a view similar to FIG. 36, but showing the components in positions assumed during a thermal overload.

As is best shown in FIGS. 34-36 of the drawings, the opposite side edges of member 178 preferably extend beyond the opposite side edges of the underlying solder billet 172, and the opposite end portions of member 178 preferably extend beyond the opposite ends of billet 172 and beyond the opposite ends of arrestor housing 158. In the embodiment of FIG. 35 the central portion of billet 172 overlies ground electrode 162 of arrestor 156, and opposite end portions of billet 172 overlie respective adjacent ones of line electrodes 160 of arrestor housing 158.

The embodiment of FIG. 34 differs from that of FIG. 35 primarily in that the opposite ends of billet 172 portions are spaced axially inwardly from, and do not overlie, electrodes 160. Consequently, while the solder flux employed in the FIG. 34 embodiment may be of the previously described flux 168 type, other flux not having the dielectric insulating properties of flux 168 may instead be used in the embodiment of FIG. 34.

When the arrestor 156 of FIG. 34 is subjected to thermal overload solder billet 172 melts and molten solder from the billet flows axially, as well as in other directions, along the exterior surface of arrestor housing 158 into engagement with line electrodes 160 so as to thereby establish a dense and highly conductive short circuit between each of such electrodes and the ground electrode 162 underlying the billet. When the solder flux is of the preferred type that causes the molten solder to thoroughly wet housing 158 of arrestor 156, the molten solder will flow not only to the annular surfaces of the electrodes, but also to the outer end surfaces of line electrodes 160. This will normally occur irrespective of the orientation of arrestor housing 158. Tin plating the ground electrodes and the undersurface of the channel shaped billet retainer 178 also improves the wicking of the molten solder.

The axial flow of molten solder from billet 172 is enhanced by the generally V-shaped configuration of channel member 178. As is shown in FIG. 36, the opposite side edges of member 178 preferably extend outwardly beyond the opposite side edges of billet 172, and normally are spaced slightly above the underlying cylindrical surface of arrestor housing 158. When solder billet 172 melts in response to a thermal overload condition, molten solder passes initially from both the opposite ends and the opposite sides of billet 172 and channel member 178. This initial passage of molten solder from the billet, in conjunction with the downward biasing force imposed upon member 178 by spring 182, causes member 178 to descend until its opposite side edge portions engage the underlying surfaces of arrestor housing 158. Such engagement restricts, if not altogether stops, the passage of molten solder from beneath the opposite side edge portions of member 178, which in turn causes preferential flow of the molten solder parallel to the central axis of arrestor housing 158 through the opposite ends of the space overlaid by member 178 and to electrodes 160.

While in the illustrative embodiments solder flux 168 is provided upon substantially all of the exterior surfaces of arrestor housing 158, the flux might instead be applied, in bands or the like, only to selected surfaces of the housing upon which solder is to flow.

In lieu of solder flux that is applied separately, the solder flux may be integral with the solder material of billet 172.

If the exterior surface of housing 158 were flat or of some other non-arcuate shape, channel member 178 might be U-shaped rather than V-shaped.

Another embodiment of a fail-safe mechanism 194 for a surge protector 196 is shown in FIG. 39 of the drawings. Mechanism 194 includes a retainer 195 having a central section that is welded or otherwise secured upon the cylindrical body of surge protector 196. Protector 196 has live electrodes 200 at its opposite ends, and a centrally disposed ground electrode 202. Resilient legs 204 extending outwardly from opposite sides of retainer 195 overlie the aforesaid electrodes and an intervening strip of heat sensitive non-conductive plastic film 206 or similar material that melts or otherwise disintegrates when protector 198 is subjected to a thermal overload. Melting of film permits engagement of resilient legs 204 with the underlying electrodes 200, 202, which in turn shunts the current to ground via a pin type ground terminal 208 projecting downwardly from electrode 202.

FIGS. 40–51 disclose another embodiment of a terminal block and fail-safe mechanism in accordance with the invention. Components similar or identical to ones shown and described previously herein are identified by the same reference numerals, with the addition of a prime designation.

The terminal block identified in its entirety in FIGS. 40–42 by the numeral 12' includes a base 14' that may be of any desired length. Base 14' illustratively extends horizontally and is of generally rectangular shape. A multi-core cable 16' extends into an end of base 14'. Although it may be mounted upon other structures, and in other ways, block 12' illustratively is mounted upon a perforate panel 210 of a pedestal mount (not otherwise shown). The means mounting the block upon panel 210 illustratively includes a bracket 212 that is secured to the upper surface of the panel by threaded fasteners 214. Generally U-shaped channels 216 (only one of which is shown in FIG. 40) upon opposite sides of bracket 212 receive flanges 218 that project outwardly from opposite sides of base 14'. The flanges restrict lateral and upward movement of base 14' relative to bracket 212, while permitting longitudinal adjustive movement of the base relative to bracket 212 and panel 210. The base's capability for such movement facilitates vertical alignment of threaded fasteners 220, that extend through a slot 222 adjacent an end of base 14', with underlying bores 224 in panel 210. Tightening of fastener 220 secures the rightmost (as viewed in FIG. 40) end of base 14' to panel 210. An internally threaded socket 226 opening from the upper surface of bracket 212 receives a threaded fastener 228 that releasably secures the leftmost end of base 14' to bracket 212, and thus to panel 210.

When fastener 228 is tightened its head conductively engages a ground contact 230 of a ground strip 232 within a channel 234 that extends longitudinally of base 14' and underlies the driver modules 50' upon base 14'. Ground strip 232 connects to a ground eyelet which is connected by a ground clip to the cable shield when shielded cable is used.

A plurality of pairs of upstanding slotted socket members 238 upon base 14' receives the lower end portions of insulation displacing connectors 24' that extend in substantially the same angled "overlapping" relationship to each other as the connectors 14 of the FIGS. 1–11 embodiment. The connectors 24' differ from the connectors 24 in that they have tooth-like retainer elements 240 that resist upward withdrawal of connectors 24' from the slots of member 238, and also differ in that the central portion of connectors 24' have a slightly greater width than the width of connectors 24. Additionally, connectors 24' illustratively do not have a contact comparable to the contact 44 (FIG. 8) of connectors 24. Posts 56' extending upwardly from the rear part of the upper surface of base 14' are similar to the posts 56 except for their having channels 242 that receive ribs 244 (FIG. 46) projecting inwardly from opposite sides of the driver module chambers 54' that receive posts 56'

Figure 43:
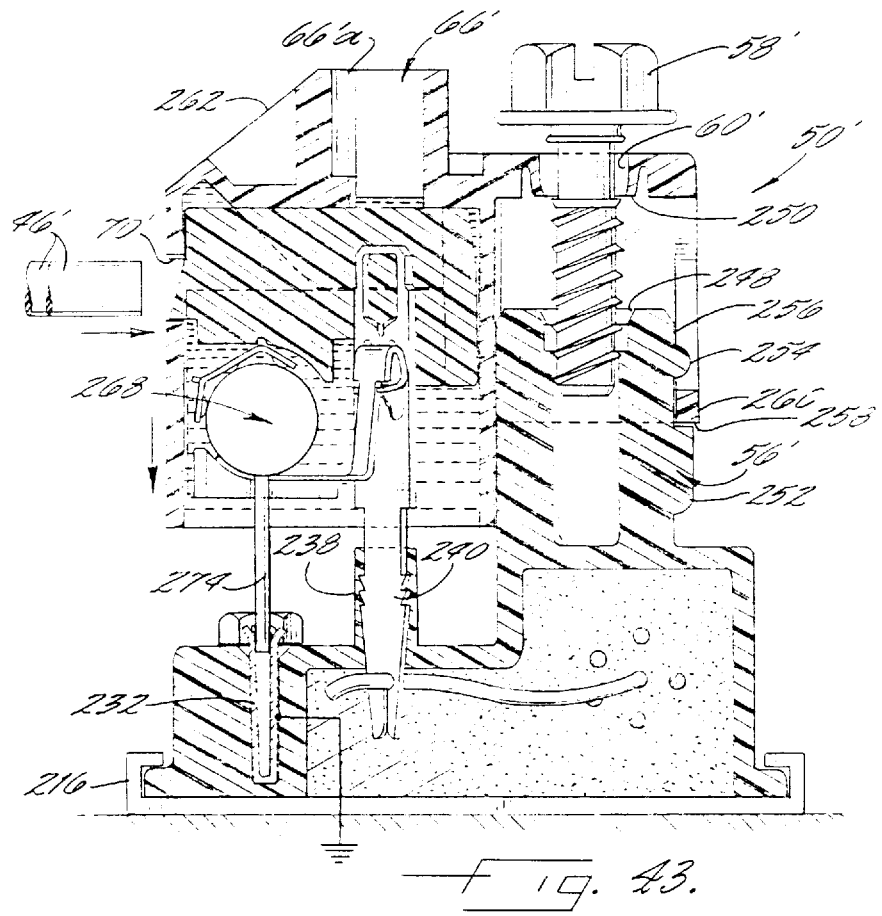
FIG. 43 is an enlarged sectional view taken approximately along the line 43 of FIG. 41 through one of the driver modules and the base of the terminal block of FIG. 41.
Figure 44:
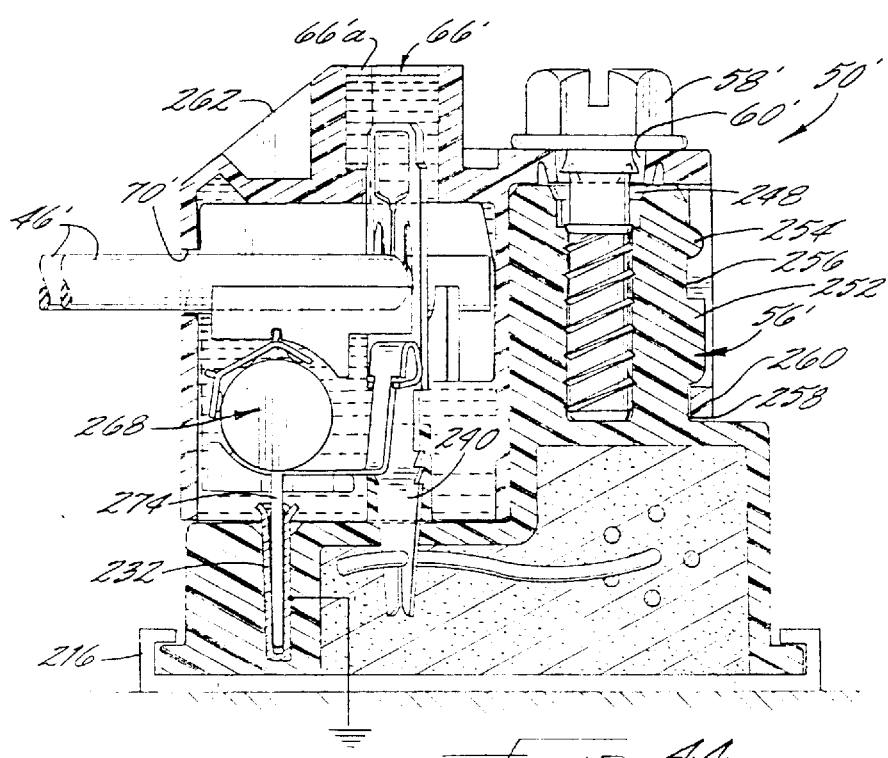
FIG. 44 is a view similar to FIG. 43 but taken along the line 44 of FIG. 41 through a driver module in a lower position.

Driver modules 50' are cantilever mounted uponrespective ones of the posts 56' for movement between upper and lower positions respectively shown in FIGS. 43 and 44. Vertical movement of a module 50' between such positions is effected by a screw-type fastener 58', illustratively and preferably of the self-tapping type, which extends through an opening 60' of the module and into a vertically extending blind bore 248 located in and opening from the upper end of post 56'. A collar 250 (FIG. 43) extending downwardly from the upper end of opening 60' facilitates formation of the initial screw threads in bore 228 without "stripping" of such threads, and resists inadvertent complete removal of fastener 58'.

Module 50' also differs from the module 50 of FIGS. 1–11 in various other respects. The vertically extending rear wall of each mounting post 56' has, upon its rear surface, a cam element 252 and an overlying abutment element 254. The rear wall of the post receiving chamber 54' of each driver module 50' has a vertically extending slot 256 into which elements 252, 254 project, and also has a flexible element 258 bordering one side of slot 256 and having adjacent its lower end a projection 260. When a driver module 50' is driven downwardly from its uppermost position by rotation in the appropriate direction of self-tapping screw 58', finger 258 is deflected laterally away from elements 232, 234 by engagement of projection 260 with such elements. W[]hen the module 50' reaches its lowermost position, finger 258 returns resiliently to a substantially vertical position wherein its projection 260 underlies cam element 252. If fastener 58' is subsequently rotated in an opposite, "loosening" direction, cam element 252 deflects flexible element 258 laterally (rightwardly, as viewed in FIG. 43) such that its projection 260 clears cam element 252. As the lower end of element 258 passes above cam element 252 resilient return movement of element 258 produces an audible and tactile signal indicating to a craftsperson that the driver module occupies its upward position. If complete removal of a module 50' from base 14' is desired, this can be effected by a craftsperson manually moving the module 50' upwardly, after fastener 58' has been removed from bore 248, since the projection 260 on finger 238 is then canned outwardly by its engagement with cam element 254.

The sections of each pair of the insulation displacing connectors 24' that extend upwardly from each pair of socket members 238 are received within insulation displacing connector chambers 66' that communicate with each other and with the passageways 70' through which service wires 46' are introduced into module 50'. Each chamber 66' has at its upper end a test port area 66'a. The test port areas 66'a differ from the test ports 66a of the FIGS. 1–11 embodiment in that each pair of adjacent test ports 66'a has at its upper end a forwardly disposed sloping wall. 262, and a rearwardly disposed vertically extending wall 264 having nonaligned sections that are separated by a shoulder 266. Test clips cannot be secured to sloping wall 262. The test clips therefore must be applied to the wall 264, and the shoulder 266 of such wall prevents inadvertent contact of adjacent test clips with each other.

The surge arrestors 268 carried by respective ones of the driver modules 50' shown in FIGS. 40–51 are generally of the construction of the surge arrestor 196 shown in FIG. 39. However, the arrestors 268 illustratively have resiliently flexible contacts 270 that extend from the opposite end contacts of the cylindrical arrestor body and have generally circular enlarged free ends 272 that engage respective ones of the connectors 24' within modules 50' in all vertical positions of the driver modules. The cylindrical body of each surge arrestor 268 is supported by and movable with a carrier 70''within module 50'. When a module 50' is moved to its lower position, a pin-type ground contact 274 extending downwardly from the central ground contact of surge arrestor 268 is received within an underlying pair of the resilient upwardly opening contacts 276 of ground strip 232. This illustratively occurs, as shown in FIGS. 43 and 44, both when driver module 50' occupies its lowermost position of FIG. 44, and also when the driver module occupies a more elevated position as shown in FIG. 43. If desired, however, engagement between the contacts could be caused to occur only when module 50' occupies a lower position. This result could be achieved by simply shortening the length of the surge arrestor contact 274.

FIGS. 50 and 51 of the drawings show an alternative embodiment of a terminal block that may be used when surge protection is not desired. In such embodiment there is no ground strip 232 or surge arrestor 268. In lieu of a surge arrestor carrier the driver module 50" of FIGS. 50 and 51 contains a nonconductive stud 277 that overlies the slot 234 that would house the ground strip if one were present.

Stud 277 also constitutes "lock out" means minimizing possible accidental use of an unprotected driver module 50" with a base containing a ground strip, The size of stud 277 is sufficiently great that if an unprotected module 50" were accidentally used in association with an "active" base containing a ground strip, stud 277 would abut the ground strip and halt downward movement of module 50" before the module reached its position shown in FIG. 51. The resistance to further downward movement of the module would notify the telecommunications craftsperson of the erroneous use of module 50".

The socket members 238 shown in FIGS. 40–44 extend upwardly to a higher elevation than the members 18 of the first embodiment. This assists in prevention of moisture and/or other foreign matter engaging the lower end portions of connectors 24', and also causes members 238 to act as pistons which pump sealant material upwardly when modules 50' are driven downwardly. The cable wires 17' are preferably surrounded by factory installed potting compound or similar protective material that is indicated by the stippling in FIGS. 43, 44, 50 and 51 of the drawings.

While preferred embodiments of the invention have been shown and described, this was for purposes of illustration only, and not for purposes of limitation, the scope of the invention being in accordance with the following claims.

We claim:

1. An insulation displacing connector, comprising:

an elongate body having opposite side edge portions, an upper edge portion interconnecting said side edge portions, a conductor inlet opening below said upper edge portion and a slot communicating with and extending downwardly from said inlet opening;

wherein said side edge portions constitute primary spring elements, and further including first and second secondary spring elements bordering first and second opposite sides of said slot; and wherein each of said secondary spring elements each has a first end connected to the elongate body of said connector, and extends in cantilever fashion from said first end thereof to an opposite free end thereof.

2. An insulation displacing connector comprising:

an elongate body having opposite side edge portions, an upper edge portion interconnecting said side edge portions, a conductor inlet opening below said upper edge portion and a slot communicating with and extending downwardly from said inlet opening; and wherein said slot decreases in width with increasing distance from said inlet opening.

3. An insulation displacing connector as in claim 2, wherein said slot has discrete sections along the length thereof of progressively decreasing width.

* * * * *

UNITED STATES PATENT AND TRADEMARK OFFICE
CERTIFICATE OF CORRECTION

PATENT NO.   :   5,863,215

DATED        :   January 26, 1999

INVENTOR(S)  :   Michael E. Grice

It is certified that error appears in the above-identified patent and that said Letters Patent is hereby corrected as shown below:

On the title page, item [75] delete the following inventors:

Christian Arthur Marie-Louise Debbaut
William Joseph Curry
Kimberley Ann Jessup
Julian Sean Mullaney Signed and Sealed this First Day of June, 1999

Attest:

Q. TODD DICKINSON

*Attesting Officer*            *Acting Commissioner of Patents and Trademarks*

UNITED STATES PATENT AND TRADEMARK OFFICE
CERTIFICATE OF CORRECTION

PATENT NO. : 5,863,215

DATED : Michael E. Grice

INVENTOR(S) : Jan. 26, 1999

It is certified that error appears in the above-identified patent and that said Letters Patent is hereby corrected as shown below:

In the Abstract insert --wires and the connectors and, in the case of larger diameter wires, to impale the service wires upon impaling elements resisting pullout of the wires-- before the period at the end of the last sentence Column 6, line 40 replace "(Connector" by -- Connector--.
Column 10, line 9 replace "907" by --90--.
Column 23, line 23 replace "canned" by --cammed--.

Signed and Sealed this

Twenty-ninth Day of August, 2000

Attest:

Q. TODD DICKINSON

Attesting Officer

Director of Patents and Trademarks